(12) United States Patent
Nelson et al.

(10) Patent No.: US 6,403,034 B1
(45) Date of Patent: Jun. 11, 2002

(54) METHOD OF REDUCING THE CONCENTRATION OF RECALCITRANT ORGANIC CONTAMINATION IN A SOIL MATRIX

(76) Inventors: Christopher Nelson, 2790 Mosside Blvd., Monroeville, PA (US) 15146; Richard A. Brown, 310 Horizon Center Dr., Lawrenceville, NJ (US) 08691

(*) Notice: Subject to any disclaimer, the term of this patent is extended or adjusted under 35 U.S.C. 154(b) by 0 days.

(21) Appl. No.: 09/234,248

(22) Filed: Jan. 20, 1999

(Under 37 CFR 1.47)

Related U.S. Application Data

(63) Continuation-in-part of application No. 08/739,795, filed on Oct. 30, 1996, now abandoned.
(60) Provisional application No. 60/008,137, filed on Oct. 31, 1995.

(51) Int. Cl.⁷ ................................................. A62D 3/00
(52) U.S. Cl. ..................... 422/32; 588/207; 588/218; 588/221; 588/224
(58) Field of Search ....................... 422/32; 423/581; 588/205, 207, 218, 221, 224

(56) References Cited

U.S. PATENT DOCUMENTS

| | | | | |
|---|---|---|---|---|
| 4,978,508 A | * | 12/1990 | Hansen et al. | 422/186.08 |
| 5,259,962 A | * | 11/1993 | Later | 210/758 |
| 5,624,635 A | * | 4/1997 | Pryor | 422/28 X |
| 5,753,494 A | * | 5/1998 | Hater et al. | 435/262.5 |

* cited by examiner

*Primary Examiner*—Elizabeth McKane
(74) *Attorney, Agent, or Firm*—Luedeka, Neely & Graham, P.C.

(57) ABSTRACT

The present invention provides a method of reducing the concentration of recalcitrant organic contamination in a soil matrix. The method includes the steps of incubating the contaminated soil matrix with unacidified ozone sufficient to reduce the concentration of the recalcitrant organic contamination in the soil matrix by about 10% to about 15%; and then applying unacidified ozone to the soil matrix sufficient to substantially reduce the concentration of the recalcitrant organic contamination in the soil matrix. During the incubation phase, the ozone demand of competitive, non-contaminant ozone consumers in the soil is satisfied. Additionally, during the incubation phase, ozone conditions the contaminated soil matrix to prepare the recalcitrant organic contamination for subsequent rapid and substantial destruction. When the concentration of the recalcitrant organic contamination has been reduced by from about 10% to about 15% in the soil, the incubation phase has ended such that the application of additional unacidified ozone to the soil matrix rapidly and substantially reduces the concentration of the recalcitrant organic contamination in the soil matrix.

21 Claims, 21 Drawing Sheets

Figure 1: Table of Relative Recalcitrance of Selected Organic Contaminants

| Compound | Solubility, μg/L | Volatility, mm Hg | ThOD g/g | BOD₅/ThOD % | COD/ThOD % | % Biodegdtn 15 days | Recalcitrant One of sol, vol, (BOD, COD, Bio) |
|---|---|---|---|---|---|---|---|
| Recalcitrance Standard | <1,000 | <1 | | <5% | <5% | <5% | |
| Benzene | 1,820,000 | 95 | 3.7 | 10 | 19 | 37 | No |
| Dichloroethene 1,2-DCE | 6300 | 185 | .66 | | | 90 | No |
| Ethylbenzene | 187,000 | 9 | 3.15 | 54.5 | | 80 | No |
| Heptane | 2,930 | 35 | 3.45 | 55 | | 100 | No |
| 1,3,5-Trimethyl Benzene | 57,000 | 2.03 | 3.2 | 3 | 10 | 100 | Marginal |
| Trinitrotoluene | 200,000 | .0002 | 2.9 | | | 0 | Yes |
| Biphenyl | 5,200 | .01 | 3.0 | 33 | | 15.2 | Yes |
| Malathion | 141,000 | .000035 | 1.5 | | 90 | 90 | Yes |
| Pentachlorophenol | 16,000 | .0002 | .54 | | | .2 | Yes |
| Acenapthene | 3470 | .0023 | 3.0 | | | 100 | Yes |
| Bis(2ethylhexyl) phthalate | 300 | .0000002 | 3.2 | 14 | | 90 | Yes |
| Chrysene | 240 | .00000006 | 3.4 | | | 38 | Yes |
| Napthalene | 30 | .02 | 3.5 | 64.2 | 22 | 9 | Yes |
| Anthracene | 75 | .00001 | 2.9 | 2 | 35 | 51 | Yes |
| Aldrin | 27 | .00007 | 2.4 | | | 0 | Strongly |
| Chlordane | 9 | .00001 | .74 | | | 0 | Strongly |
| DDT | 5 | .0000002 | 1.4 | | | 0 | Strongly |
| PCB 1260 | 2.7 | .000006 | 1.0 | | | 0 | Strongly |

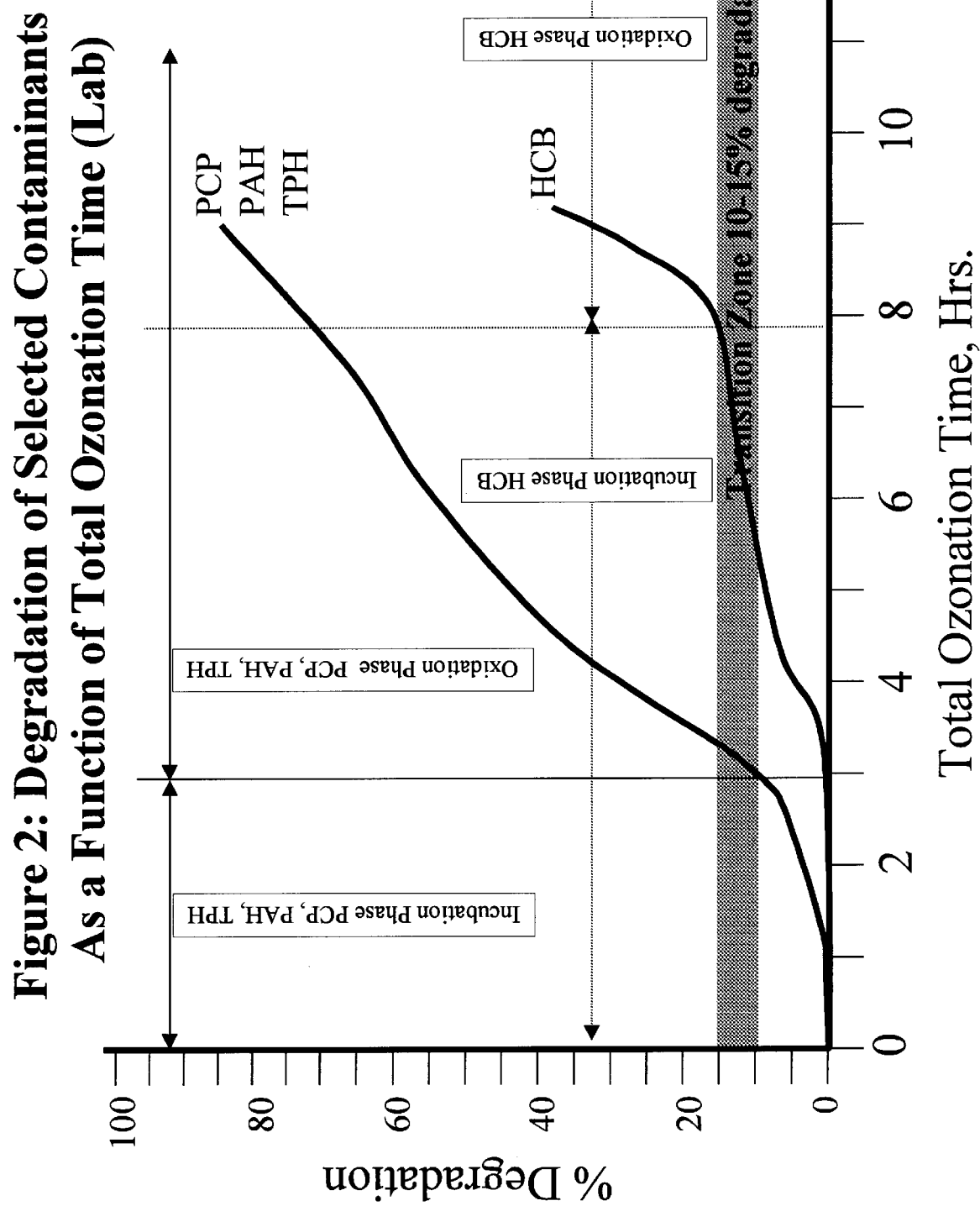

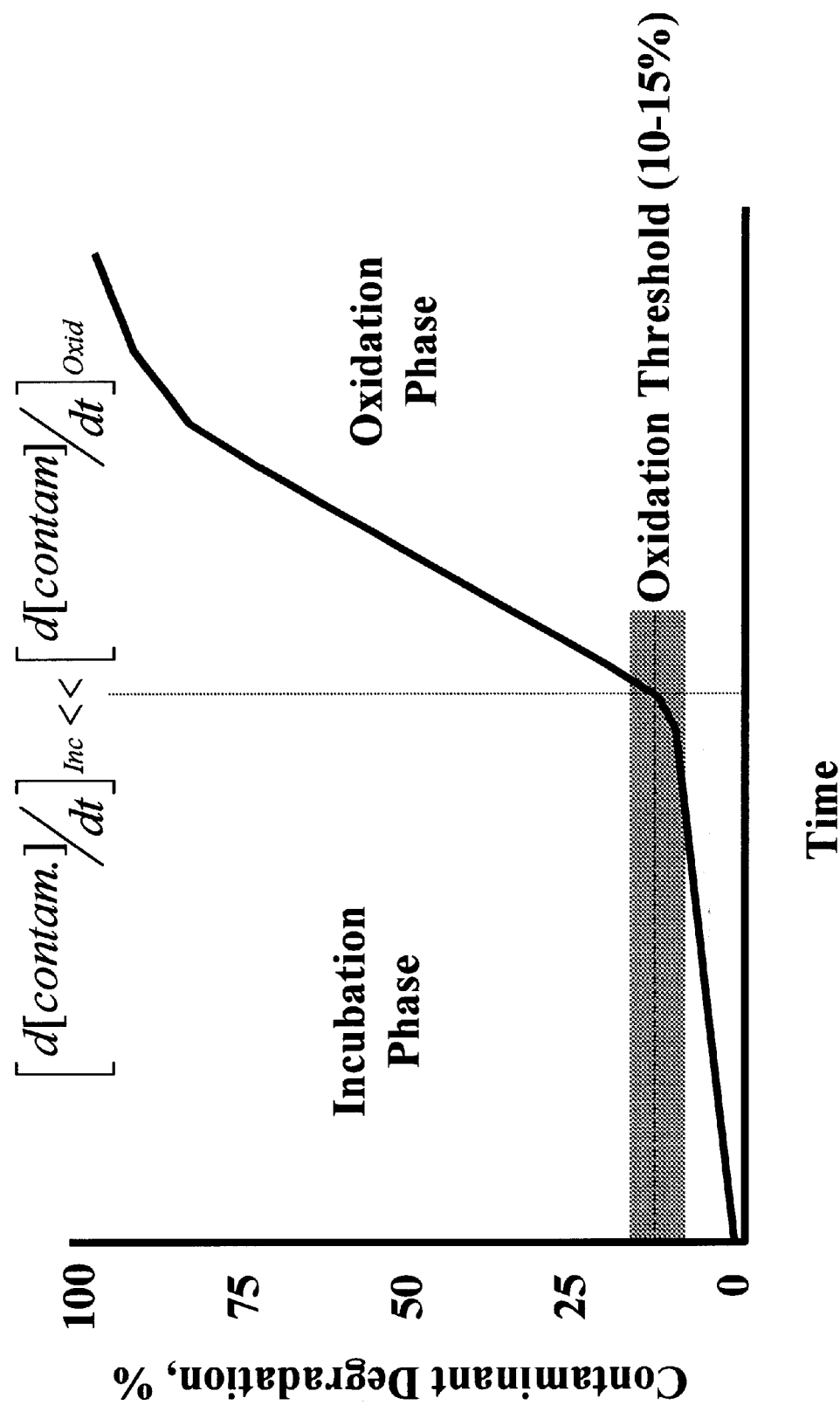
Figure 3: Oxidation of Recalcitrant Organics with Ozone

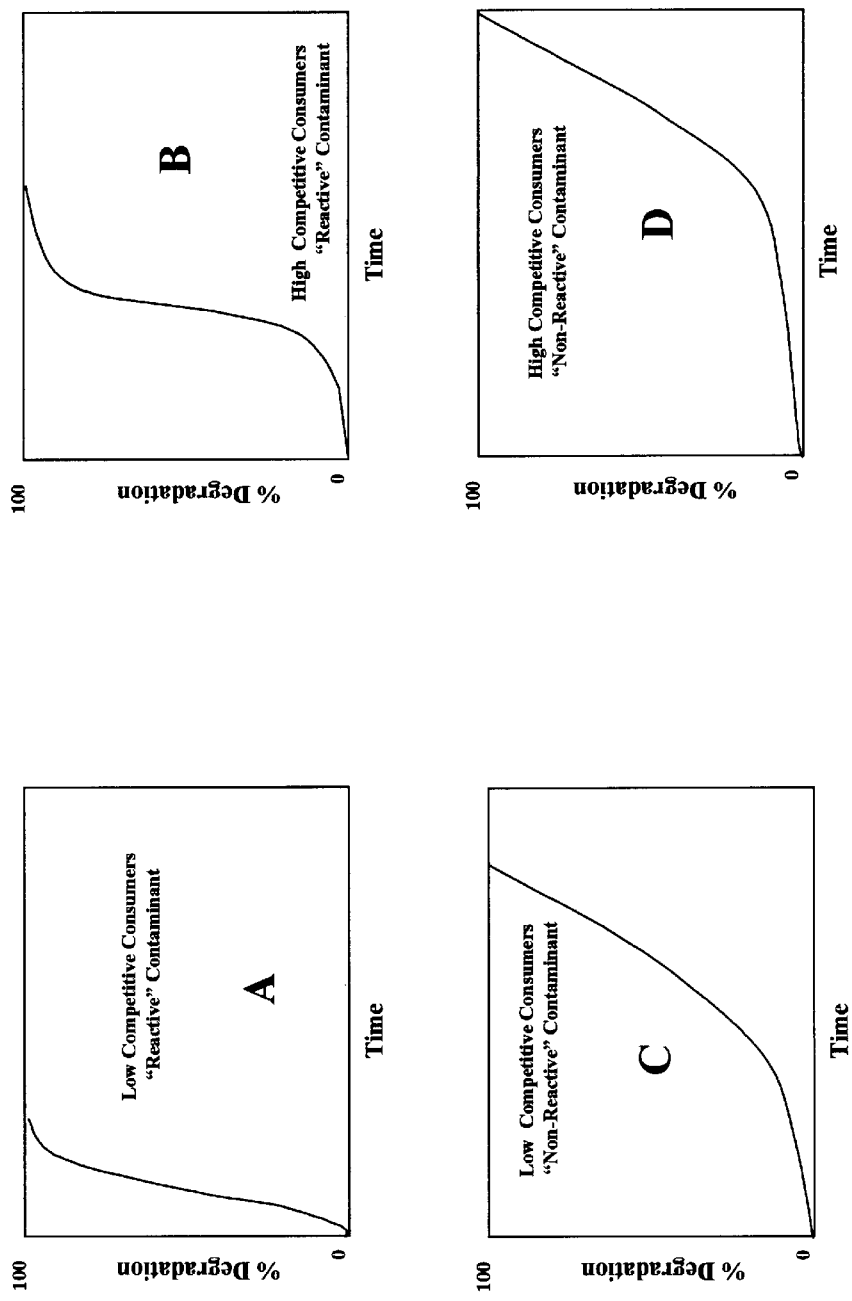
Figure 4: Variation in Response to Ozonation as a Function of the Recalcitrance of the Contaminant and the Presence of Competitive Consumers (Lab)

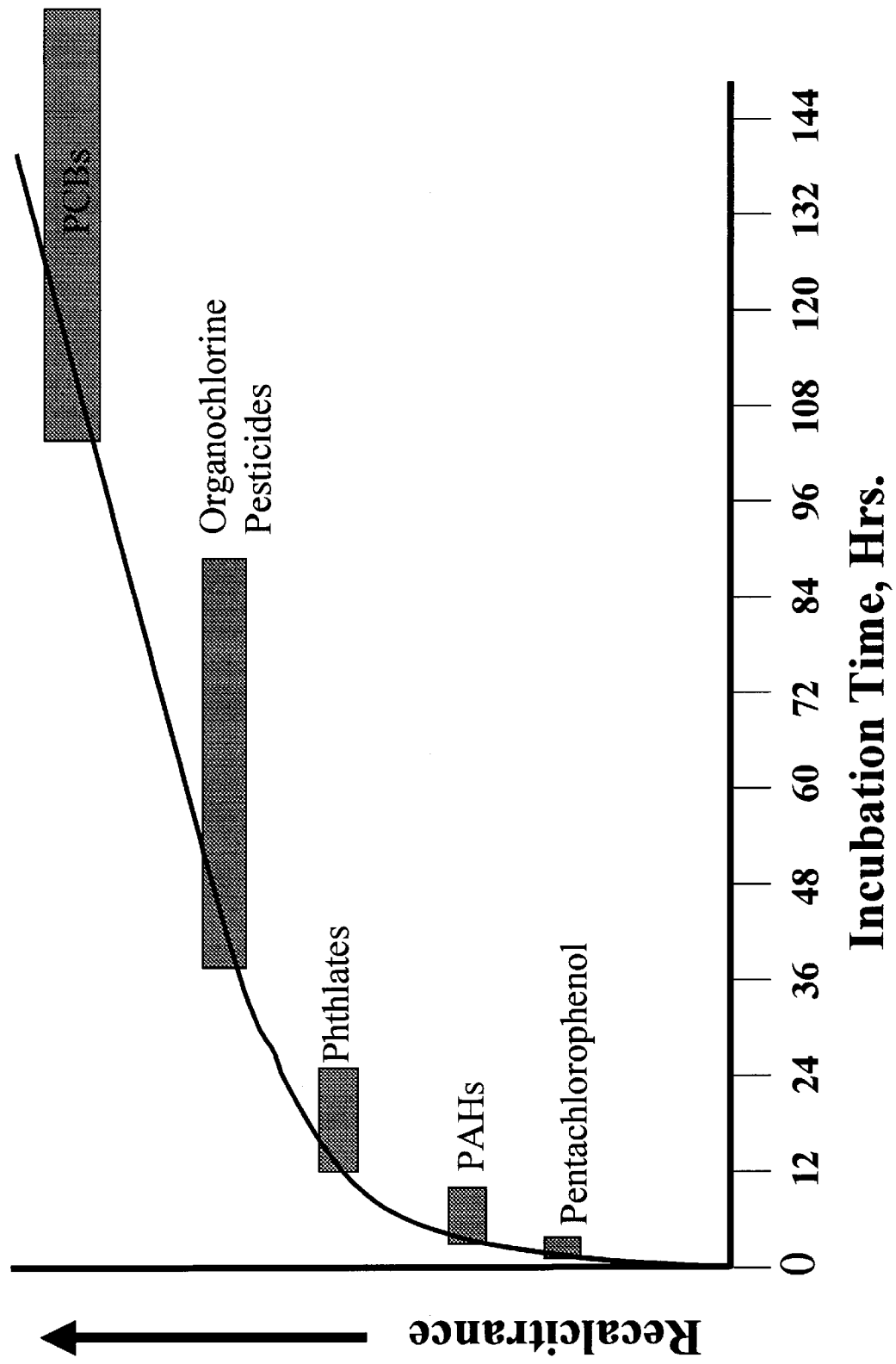

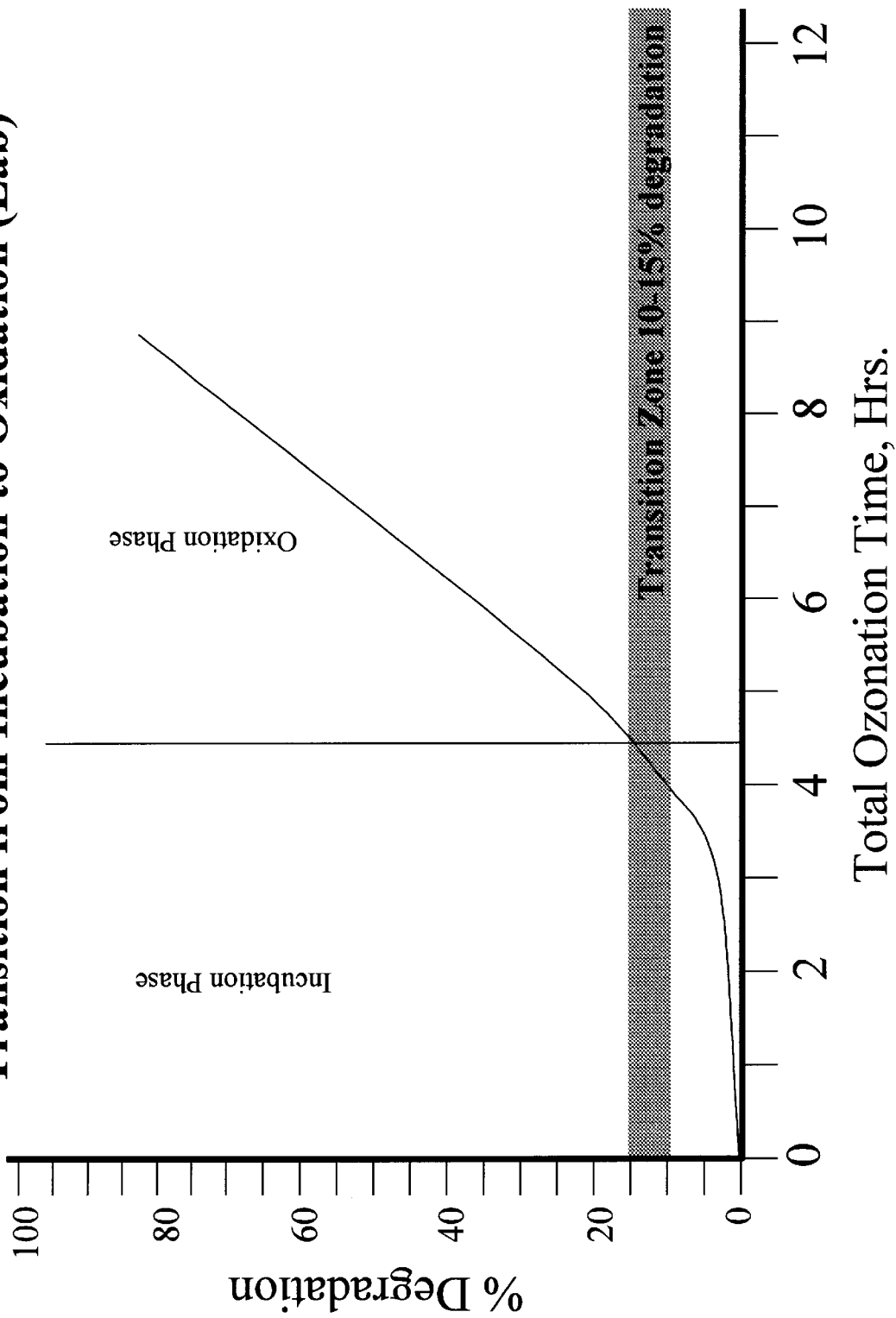

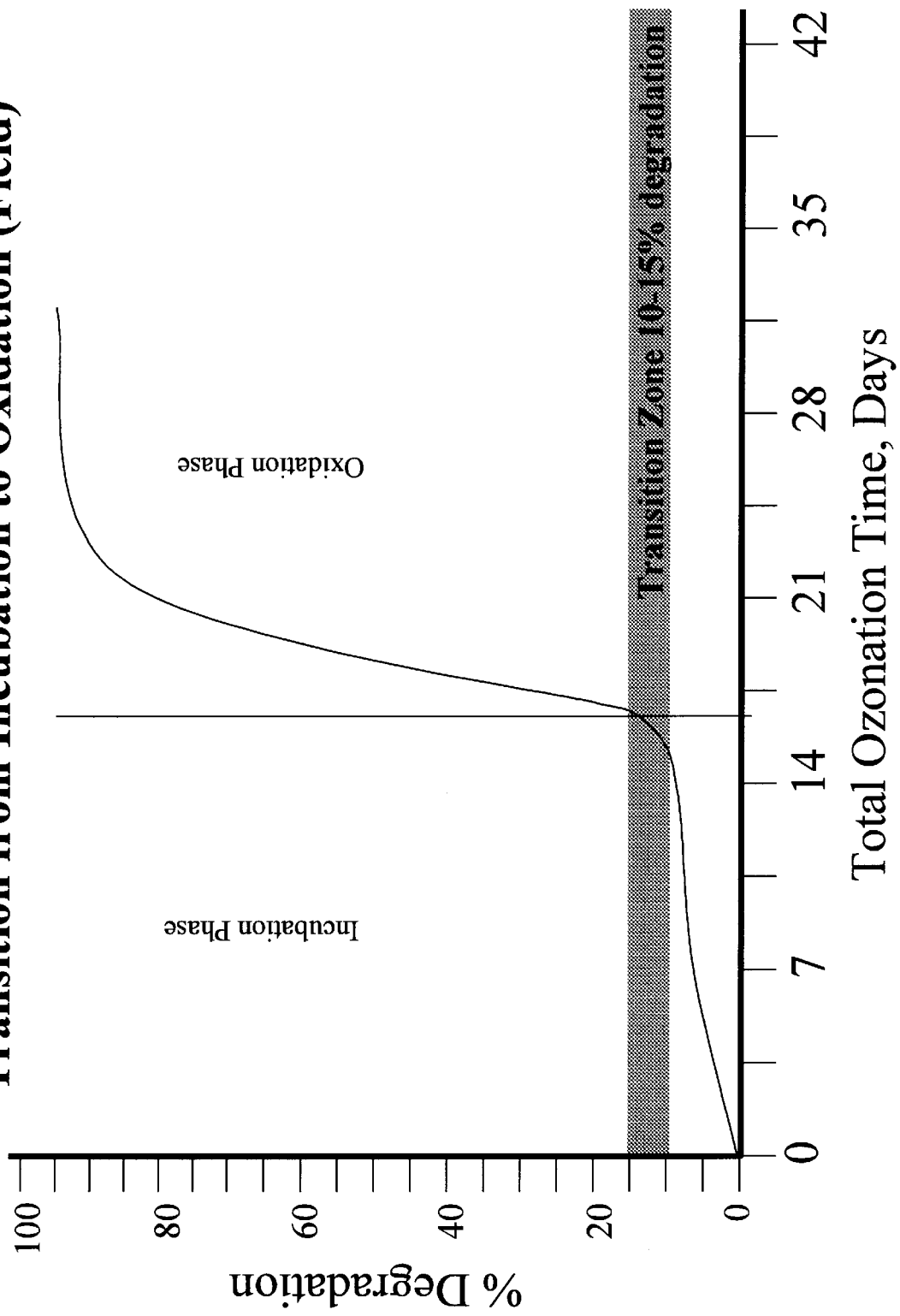

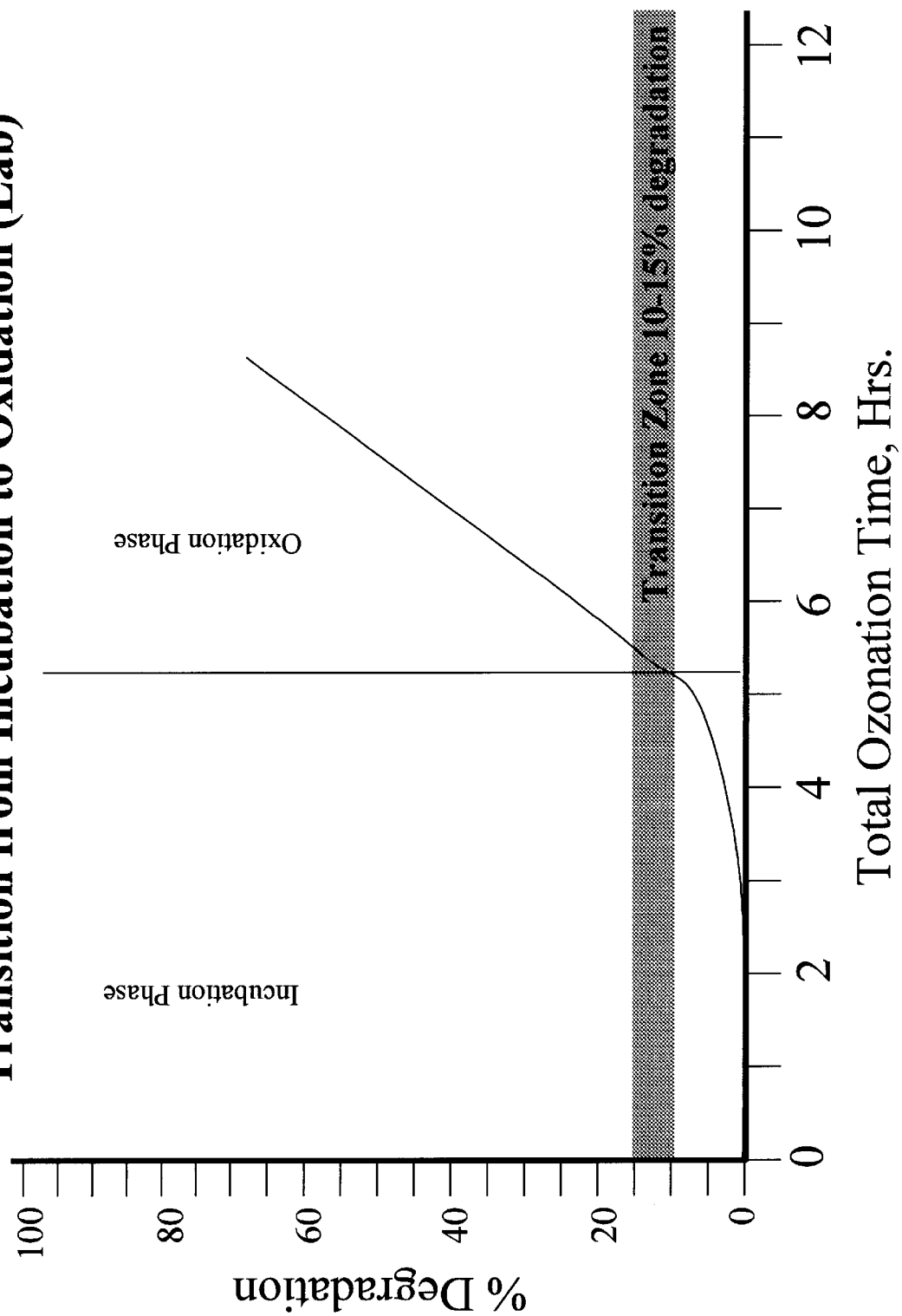

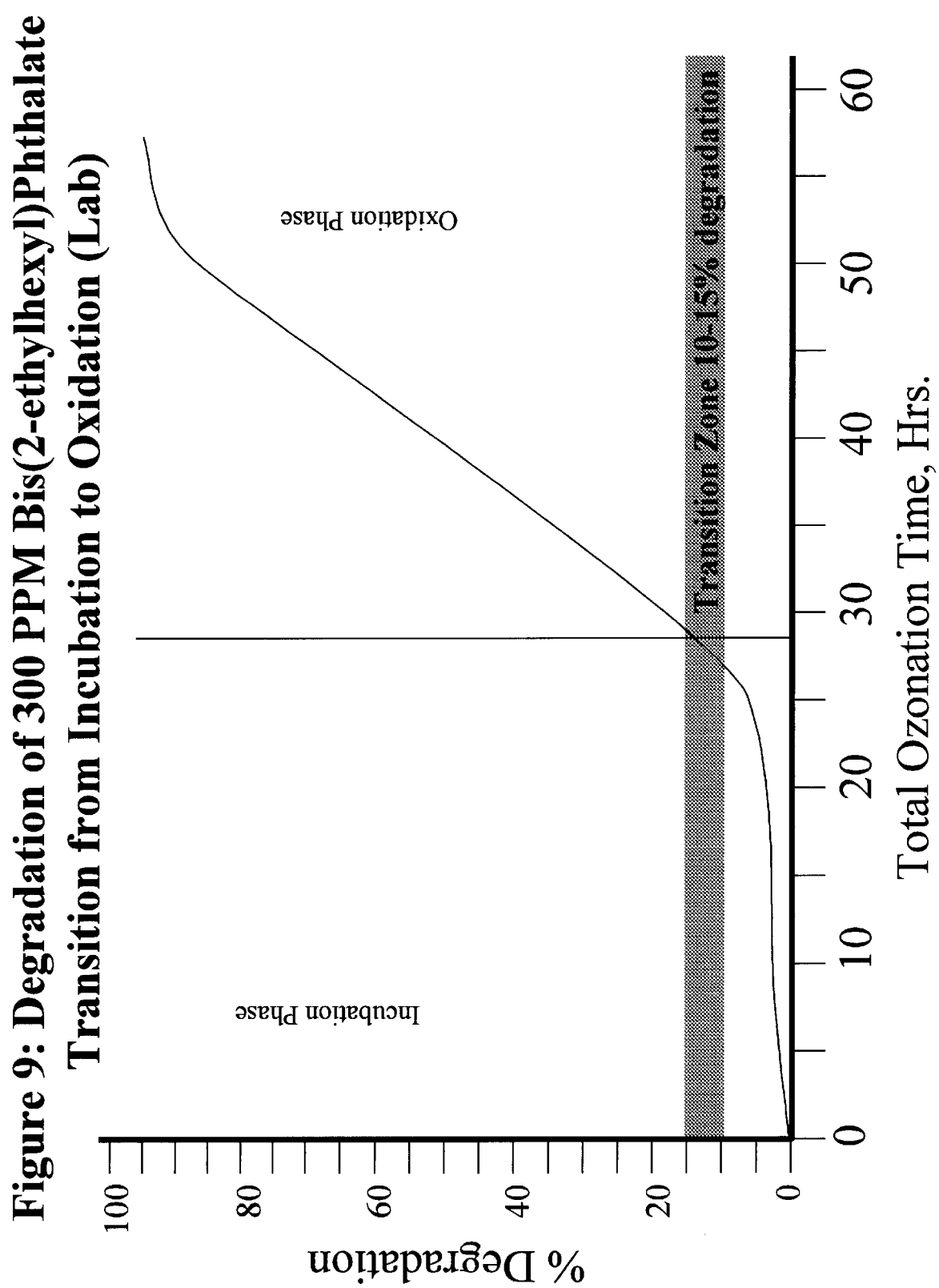

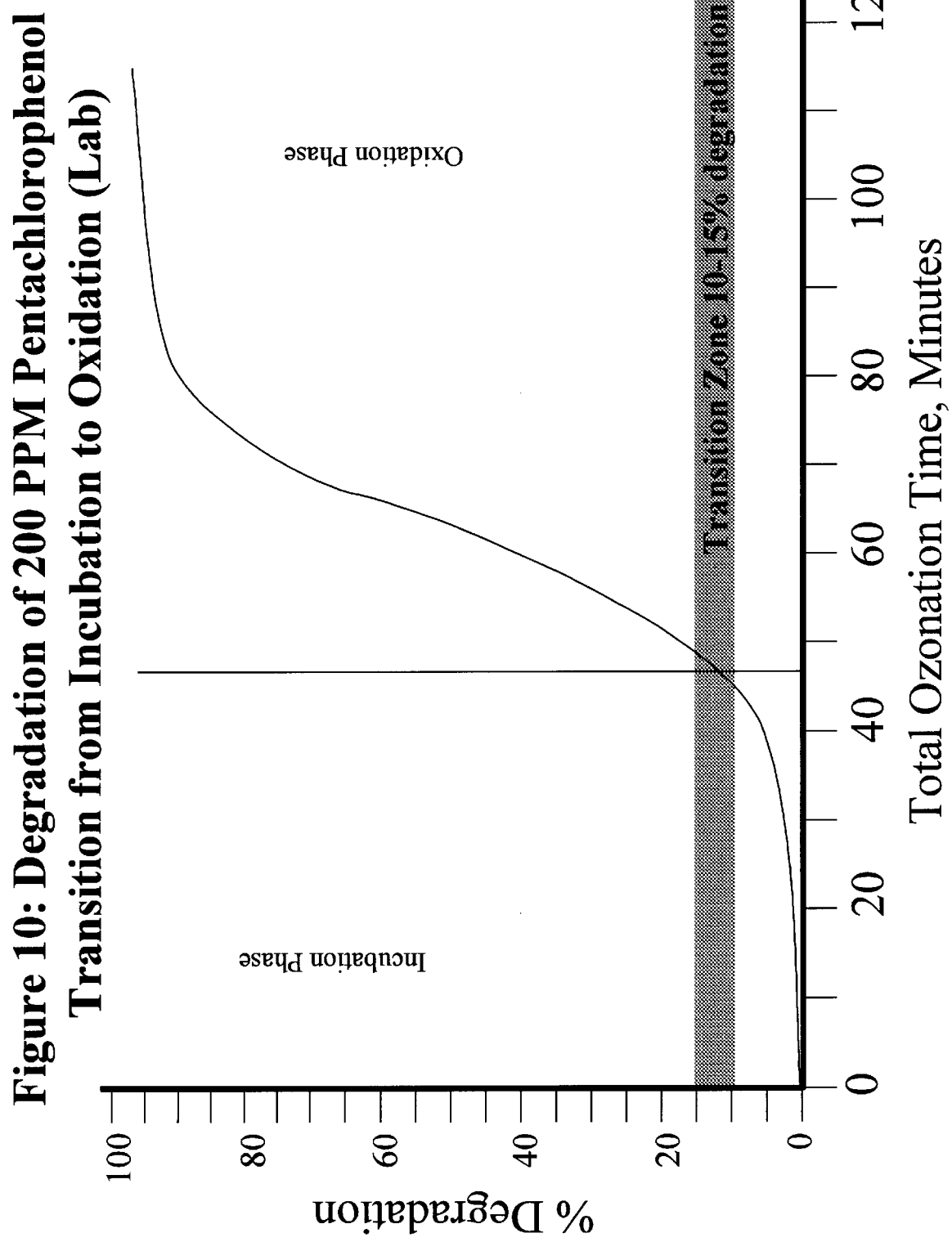

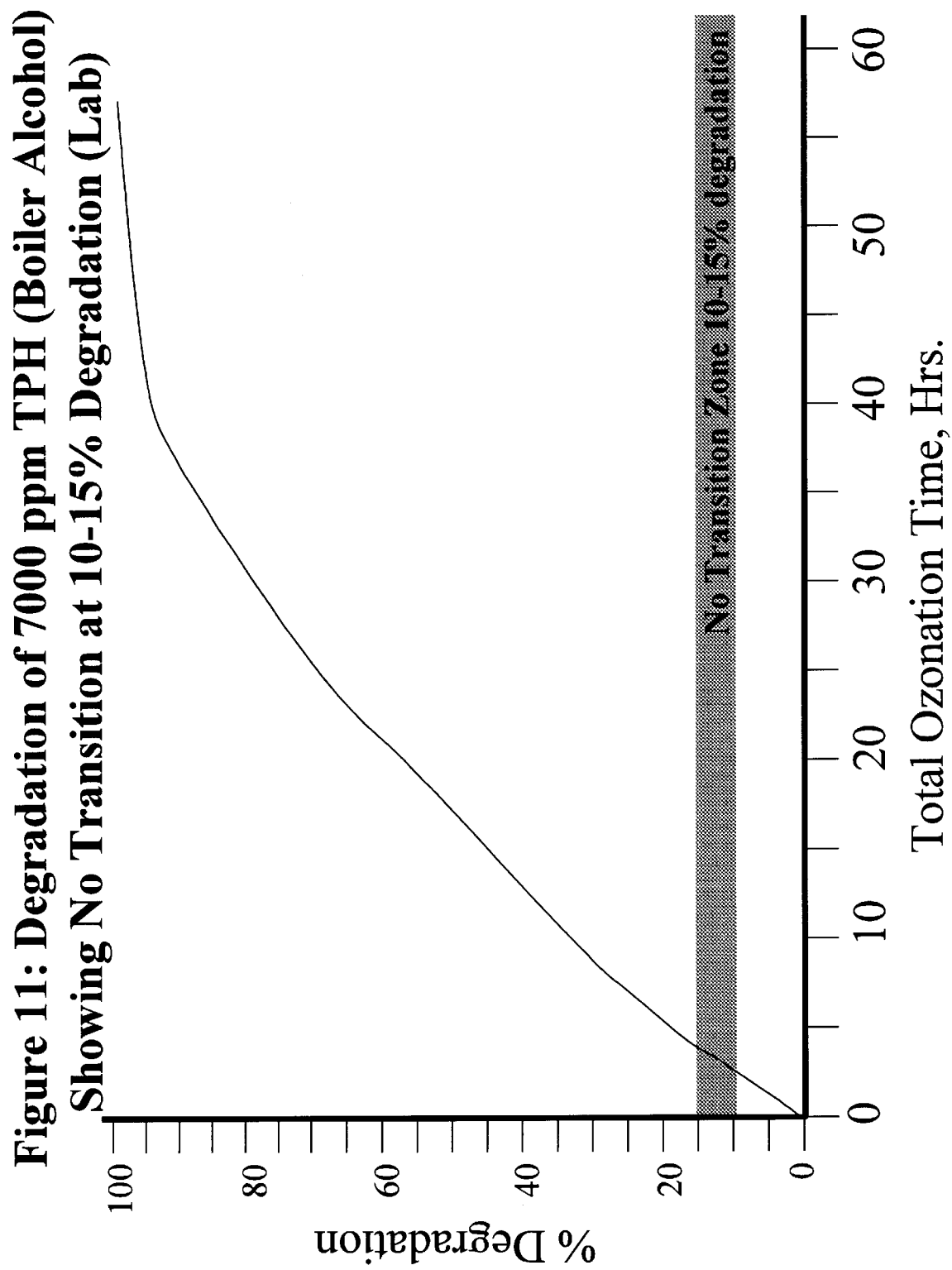

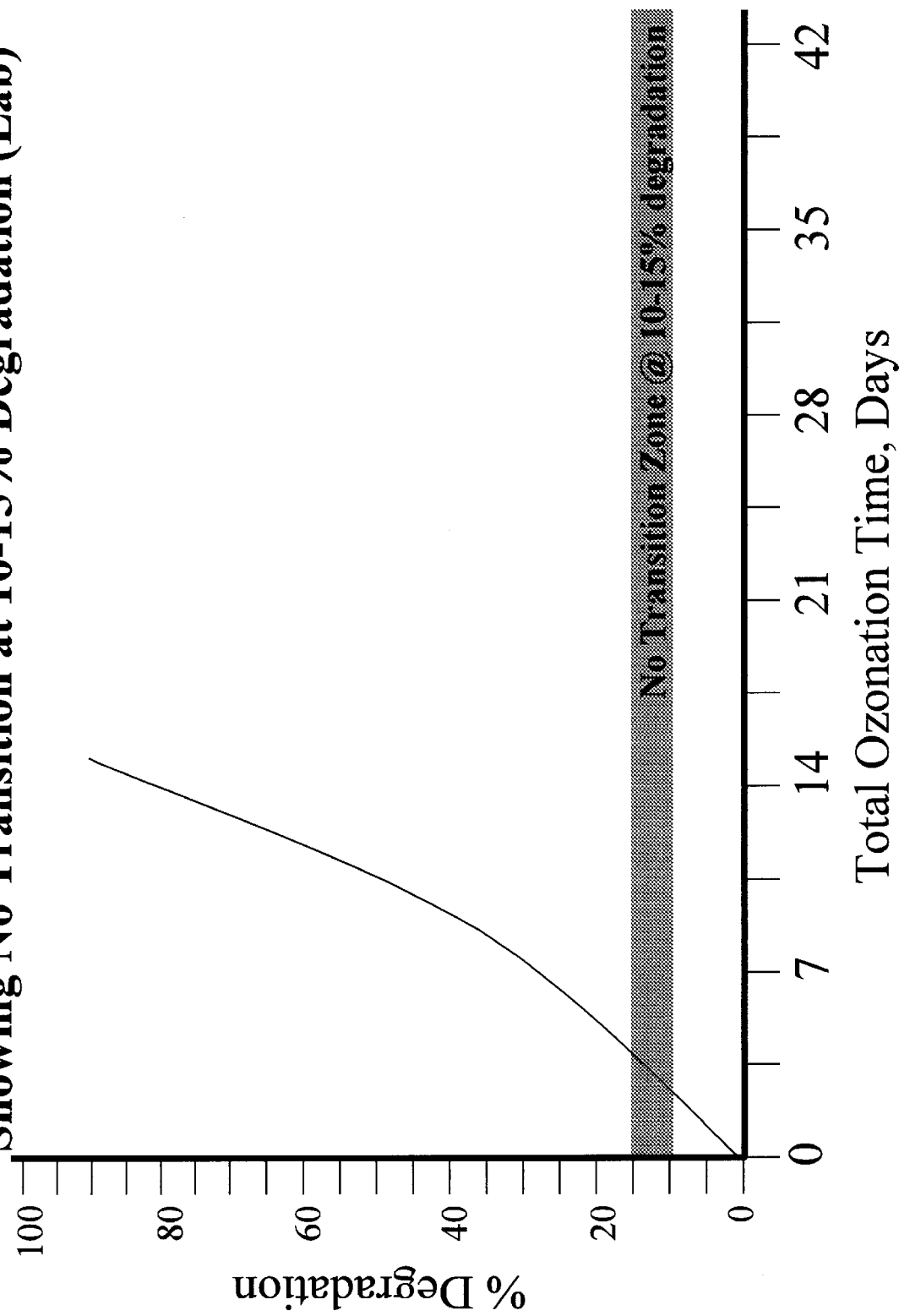
Figure 12: Degradation of 5500 PPM TPH (Fuel Oil) Showing No Transition at 10-15% Degradation (Lab)

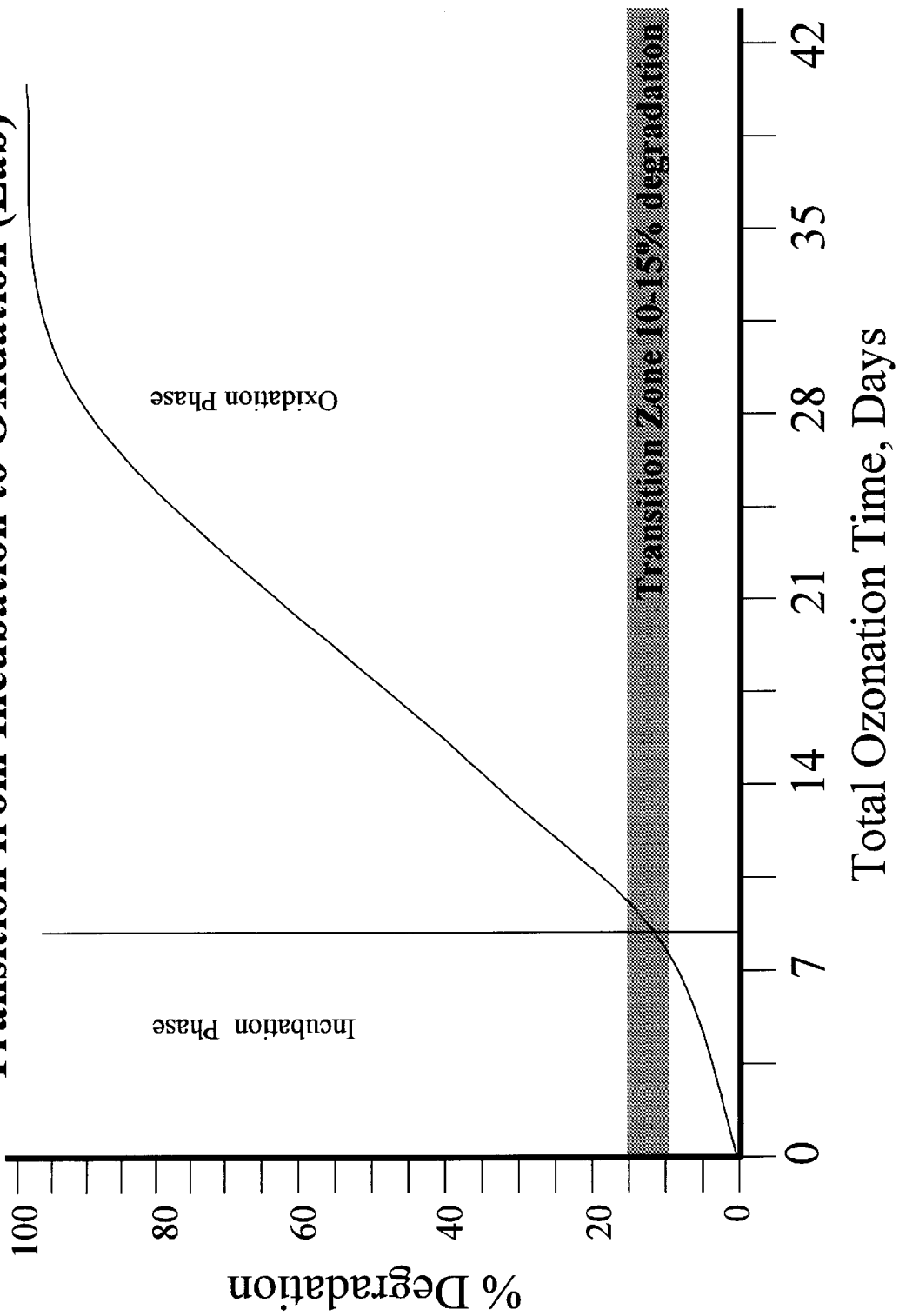
Figure 13: Degradation of 300 mg/Kg PCB 1260 Transition from Incubation to Oxidation (Lab)

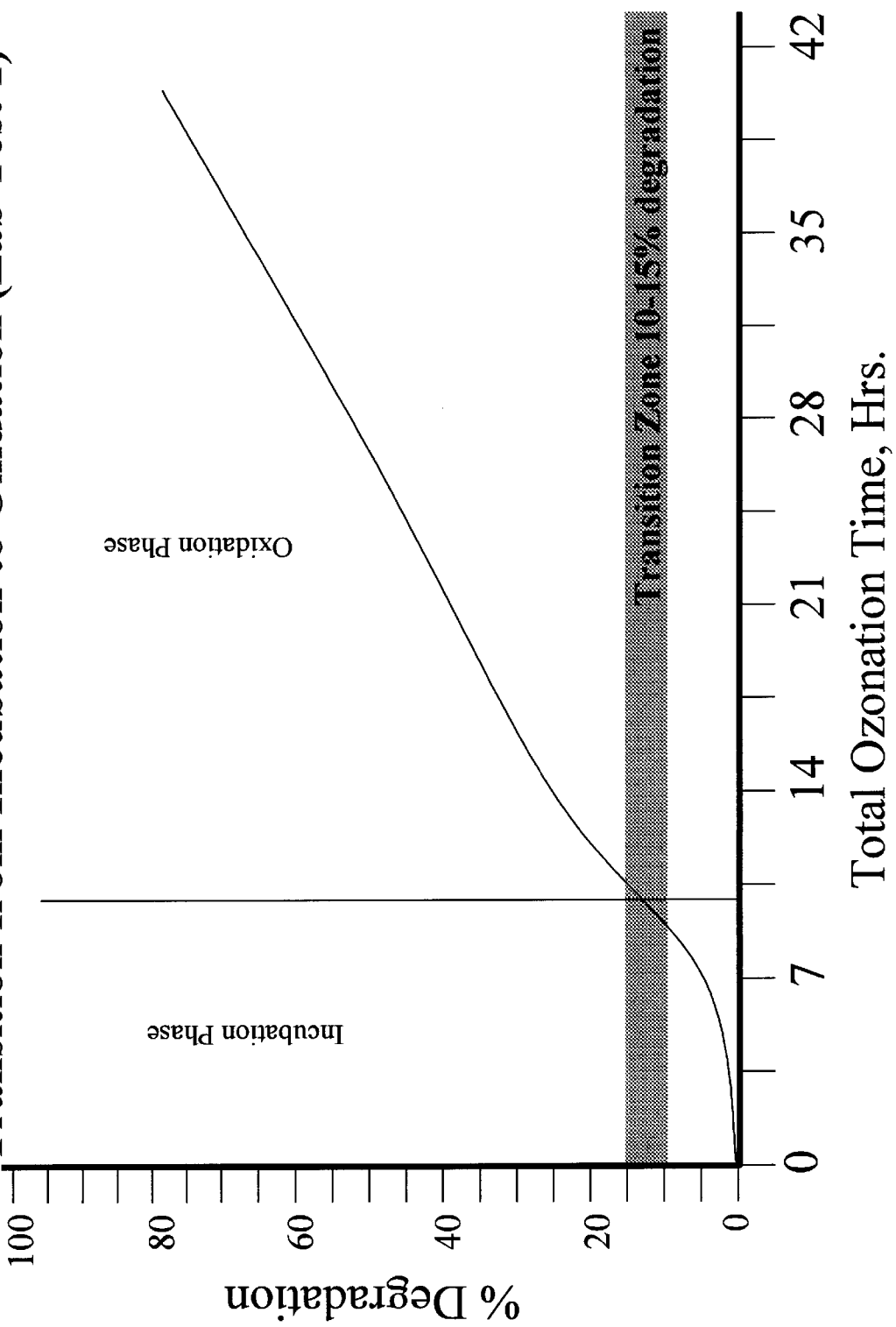

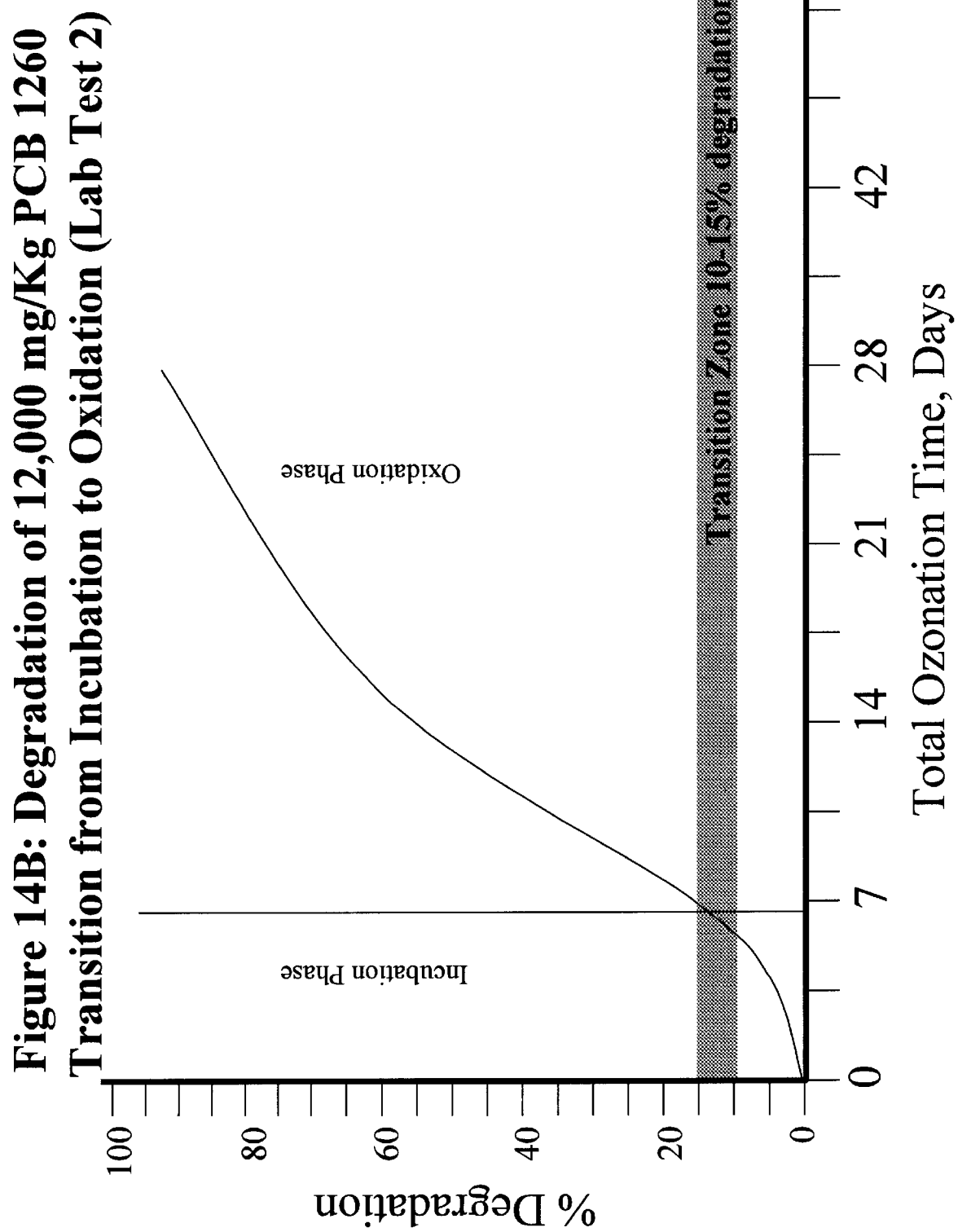
Figure 14B: Degradation of 12,000 mg/Kg PCB 1260 Transition from Incubation to Oxidation (Lab Test 2)

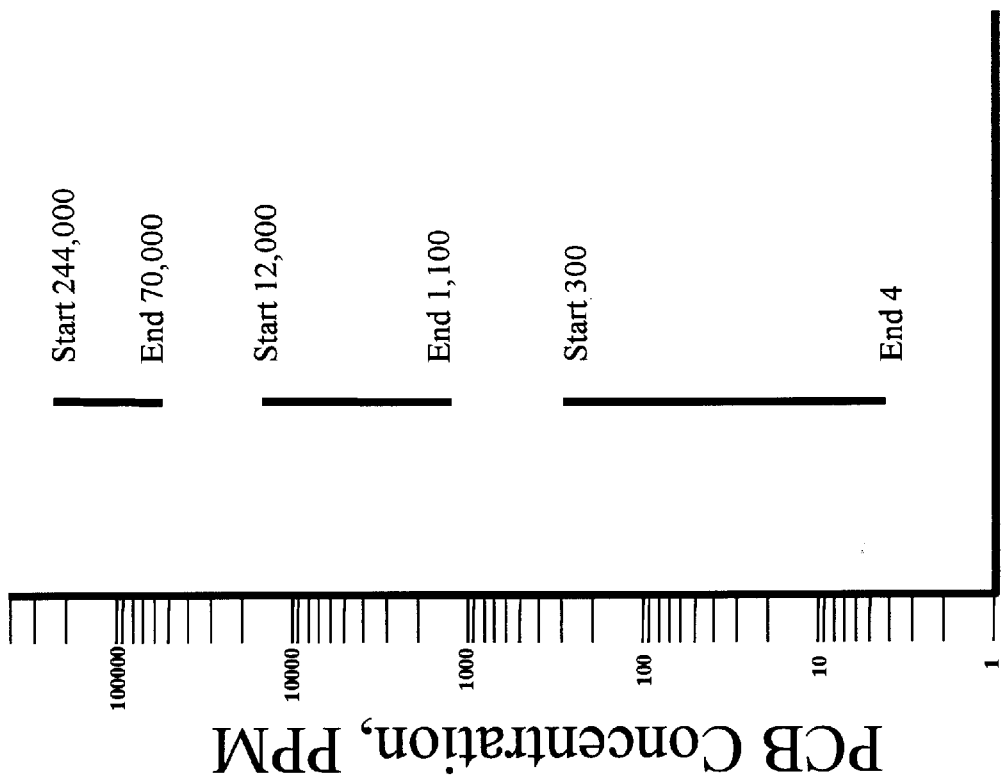
Figure 15: Degradation of PCB 1260 - Range of results (Lab)

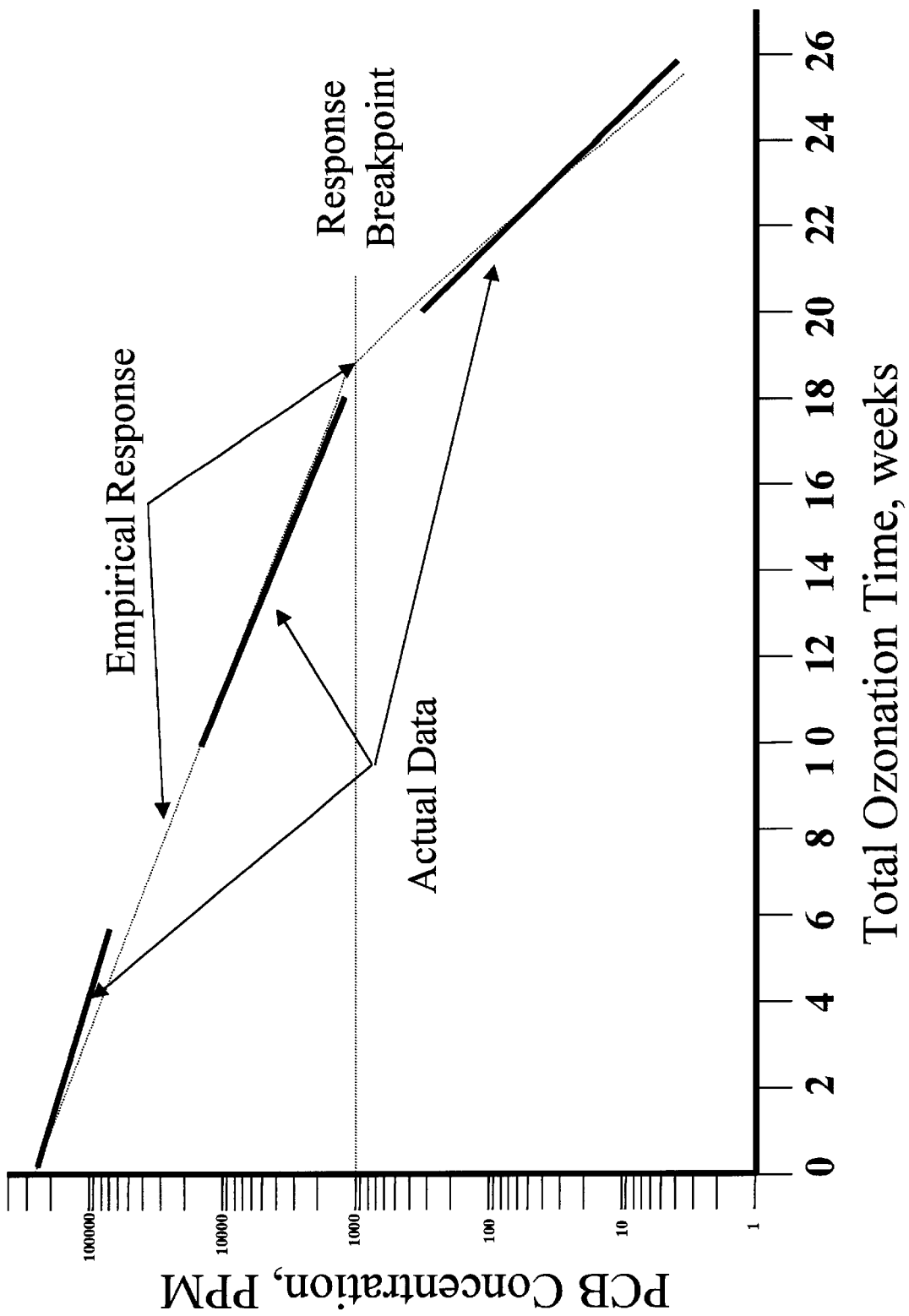
Figure 16: Degradation of PCB 1260 - Response Behavior

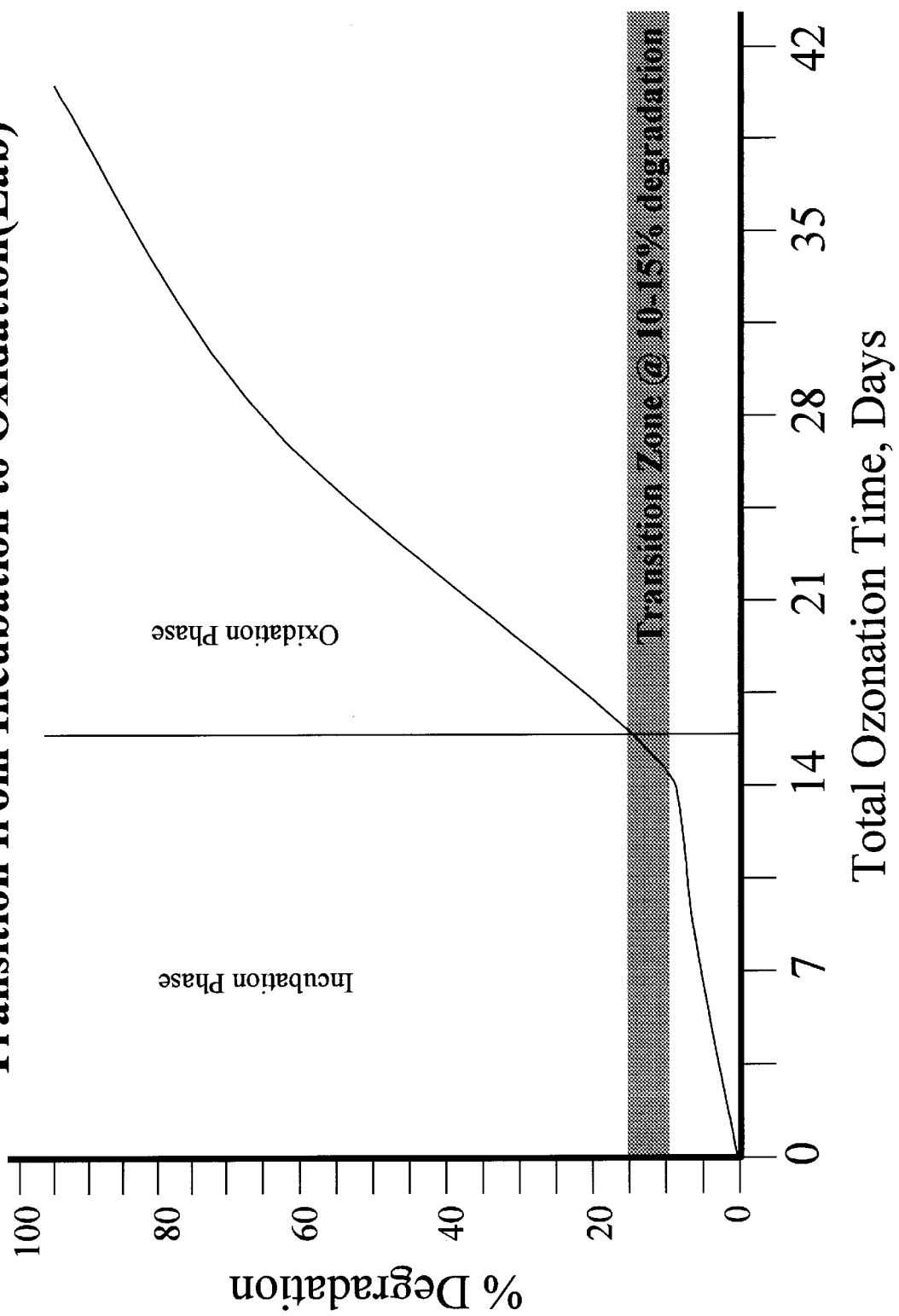

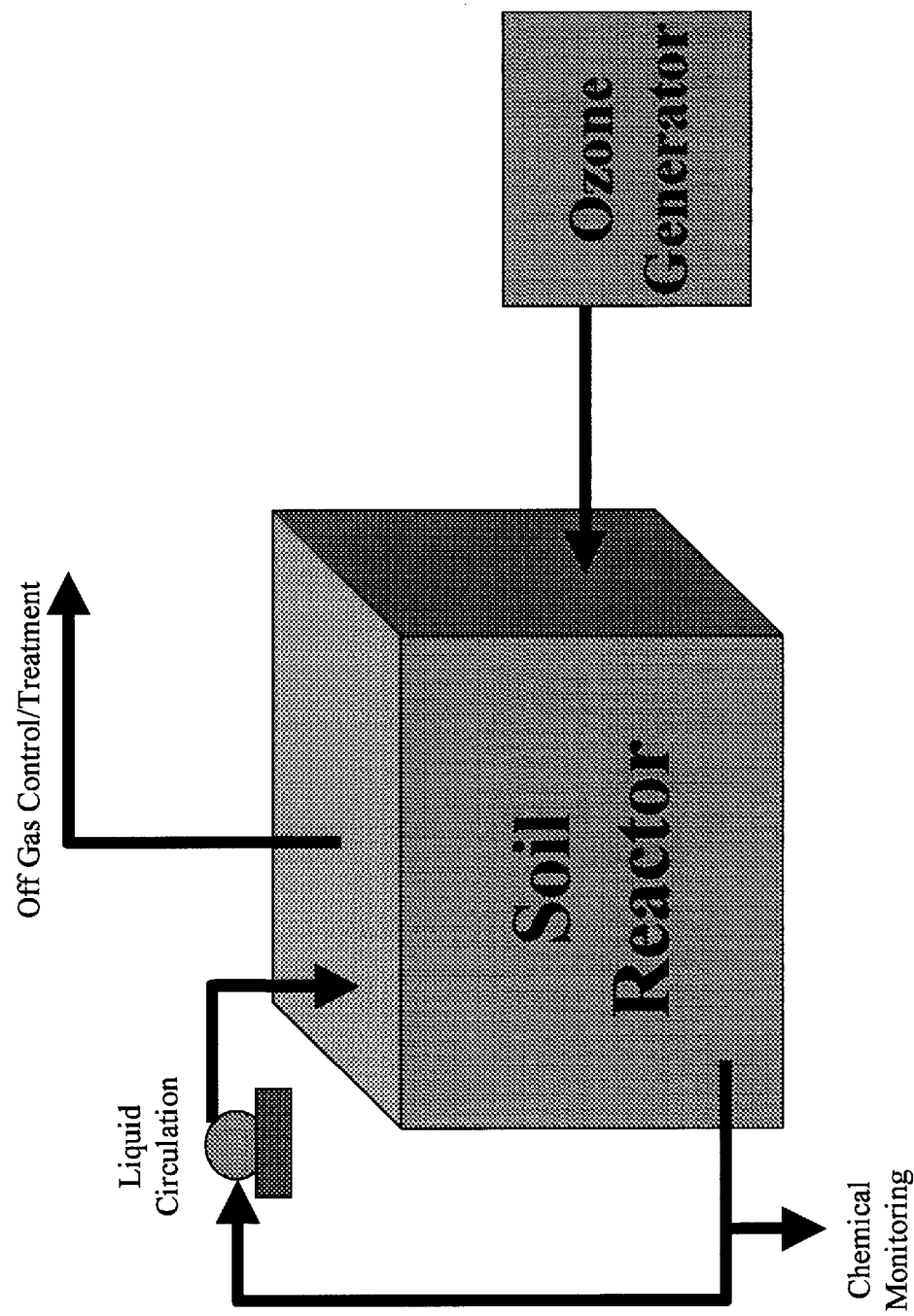
Figure 18. Ex Situ Ozone Soil Treatment System

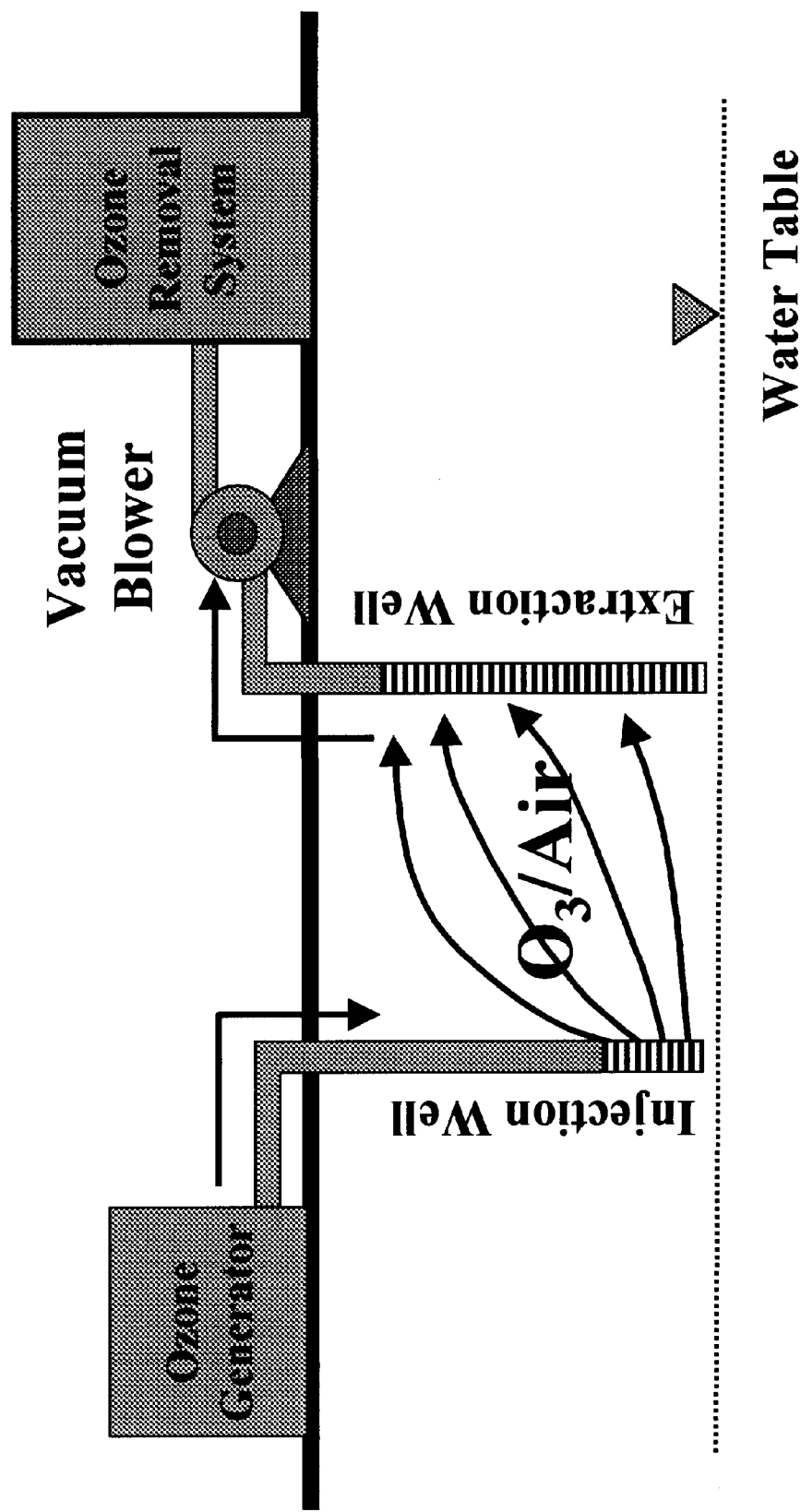
Figure 19: Vadose-Zone Ozone Treatment System

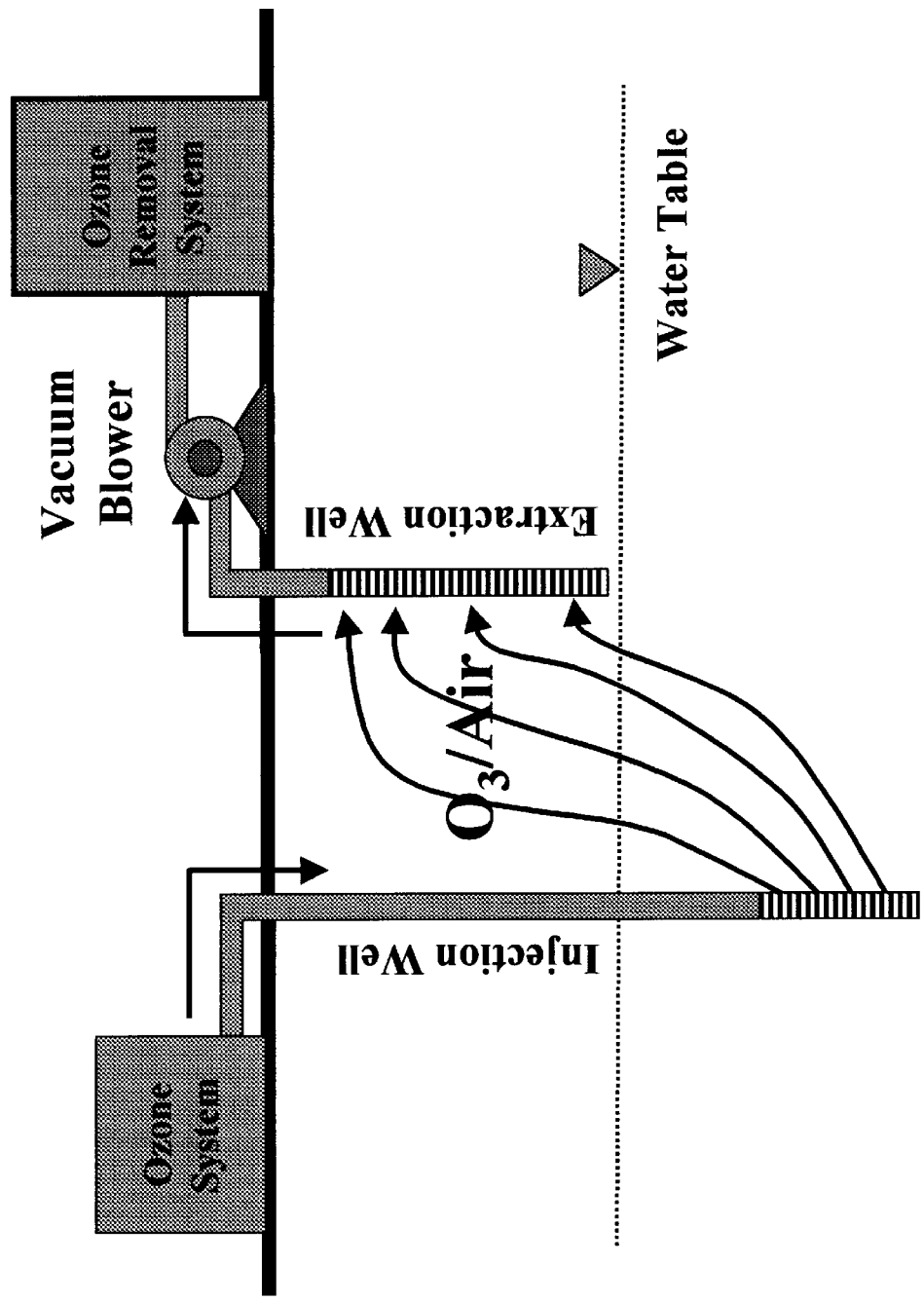
Figure 20: Saturated-Zone Ozone Treatment System

METHOD OF REDUCING THE CONCENTRATION OF RECALCITRANT ORGANIC CONTAMINATION IN A SOIL MATRIX

This is a continuation-in-part of application Ser. No. 08/739,795 filed Oct. 30, 1996, now abandoned, which application was based upon provisional application Ser. No. 60/008,137 filed Oct. 31, 1995.

BACKGROUND OF THE INVENTION

At many industrial and commercial facilities throughout the United States, soil and groundwater have become contaminated with organic pollutants. Accidental spills have occurred at other sites contaminating both soil and groundwater. A variety of techniques have been developed for the removal of these contaminants. One common technique is soil excavation and off-site treatment of the soil, which is often very expensive. Another treatment involves air sparging technology using the controlled injection of air to strip organic compounds from the water or to supply oxygen for bioremediation of the contaminants. However, complex aromatics and other large molecules are often resistant to sparging and bioremediation, thereby requiring more complex and expensive treatments. Many recalcitrant organic compounds, such as carcinogenic polychlorobiphenyls (PCBs), phthalates and organopesticides have proven particularly difficult to clean up.

Ozone is a gas with strong oxidizing properties. It is commonly generated by forcing oxygen through narrowly spaced electrodes under a high voltage known as the corona discharge method. The first commercial uses of ozone occurred in Europe in the late 1890's for the treatment of drinking water. Since then, ozone has been widely used for the treatment of drinking water and wastewater.

In the October 1997 issue of *Soil & Groundwater Cleanup*, an article ("Bubbles Spell Trouble for Chlorinated Solvents") by William B. Kerfoot discloses the injection of air/ozone into groundwater to reduce the levels of volatile organic compounds (VOCs) such as PCE (polychloroethylene), TCE (trichloroethylene) and 1,1 DCE (dichloroethylene) contained therein.

U.S. Pat. No. 5,269,943 issued to Wickramanayake discloses that ozone can be successfully used to treat unsaturated soil contaminated with organic pollutants only if the ozone is first pretreated with an acid. Wickramanayake teaches that simply applying unacidified ozone to unsaturated, contaminated soil apparently forms ozone scavengers causing the ozone to decompose too rapidly and making such ozone treatment unfeasible.

It is an object of this invention to provide a method of reducing the concentration of recalcitrant organic contamination in a soil matrix using unacidified ozone.

It is a further object of this invention to provide a method of substantially reducing the concentration of recalcitrant organic contamination in a soil matrix in a rapid manner.

It is still another object of this invention to provide a method of reducing the concentration of PCBs and other extremely recalcitrant organic contaminants in a soil matrix.

SUMMARY OF THE INVENTION

The present invention provides a method of reducing the concentration of recalcitrant organic contamination in a soil matrix. The method includes the steps of incubating the contaminated soil matrix with unacidified ozone sufficient to reduce the concentration of the recalcitrant organic contamination in the soil matrix by about 10% to about 15%; and then applying unacidified ozone to the soil matrix sufficient to substantially reduce the concentration of the recalcitrant organic contamination in the soil matrix. During the incubation phase, the ozone demand of competitive, non-contaminant ozone consumers in the soil is satisfied. Additionally, during the incubation phase, ozone conditions the contaminated soil matrix to prepare the recalcitrant organic contamination for subsequent rapid and substantial destruction. When the concentration of the recalcitrant organic contamination has been reduced by from about 10% to about 15% in the soil, the incubation phase has ended such that the application of additional unacidified ozone to the soil matrix rapidly and substantially reduces the concentration of the recalcitrant organic contamination in the soil matrix.

BRIEF DESCRIPTION OF THE DRAWINGS

FIG. 1 is a Table of Relative Recalcitrancy for Selected Organic Contaminants showing the standards of recalcitrance and how those standards apply to various organics contaminants.

FIG. 2 is a graph of Degradation of Selected Contaminants as a Function of Total Ozonation Time (Lab).

FIG. 3 is a graph of Oxidation of Recalcitrant Organics with Ozone showing contaminant degradation as a function of time.

FIG. 4 is a graph of Variation in Response to Ozonation as a Function of the Recalcitrance of the Contaminant and the Presence of Competitive Ozone Consumers (Lab).

FIG. 5 is a graph of the Minimum Incubation Times for Selected Contaminants (Lab).

FIG. 6 is a graph of Degradation of Carcinogenic PAHs: Transition from Incubation to Oxidation (Lab).

FIG. 7 is a graph of Degradation of Carcinogenic PAHs: Transition from Incubation to Oxidation (Field).

FIG. 8 is a graph of Degradation of Benzo(a)pyrene: Transition from Incubation to Oxidation (Lab).

FIG. 9 is a graph of Degradation of 300 ppm Bis(2-ethylhexyl)-Phthalate: Transition from Incubation to Oxidation (Lab).

FIG. 10 is a graph of Degradation of 200 ppm Pentachlorophenol: Transition from Incubation to Oxidation (Lab).

FIG. 11 is a graph of Degradation of 7000 ppm TPH Boiler Alcohol showing no transition at 10–15% degradation (Lab).

FIG. 12 is a graph of Degradation of 5500 ppm TPH Fuel Oil showing no transition at 10–15% degradation (Lab).

FIG. 13 is a graph of Degradation of 300 mg/Kg PCB 1260: Transition from Incubation to Oxidation (Lab).

FIG. 14A is a graph of Degradation of 12,000 mg/Kg PCB 1260: Transition from Incubation to Oxidation (Lab Test 1).

FIG. 14B is a graph of Degradation of 12,000 mg/Kg PCB 1260: Transition from Incubation to Oxidation (Lab Test 2).

FIG. 15 is a log graph of the Degradation of PCB 1260—Range of Results (Lab) showing a six order of magnitude reduction in PCB concentration that has been achieved using the present invention.

FIG. 16 is a graph of Degradation of PCB 1260—Response Behavior showing the degradation of PCB as a function of time.

FIG. 17 is a graph of degradation of 31 mg/kg Endosulfan II: Transition from Incubation to Oxidation (Lab).

FIG. 18 is a diagram showing an Ex-Situ Ozone Soil Treatment System.

FIG. 19 is a diagram of a Vadose-Zone Ozone Treatment System.

FIG. 20 is a diagram of a Saturated-Zone Ozone Treatment System.

DETAILED DESCRIPTION OF THE INVENTION AND PREFERRED EMBODIMENT

The present invention is a method of reducing the concentration of recalcitrant organic contamination in a soil matrix. As used herein, recalcitrant organic contamination consists of one or more organic contaminants for which at least one or more of the following standards apply: aqueous solubility of less than about 1000 µg/L; volatility of less than about 1000 mm Hg; and non-reactivity. Non-reactive compounds are those that meet the following three non-reactivity standards (to the extent such standard exists for a particular compound): a) $BOD_5$/ThOD less than about 5% ($BOD_5$ being five-day biological oxygen demand; and ThOD being theoretical oxygen demand); b) COD/ThOD less than about 5% (COD being chemical oxygen demand); and percent biodegradation at 15 days of less than about 5%.

Some organic contaminants are more recalcitrant than others. The degree of recalcitrance of a contaminant is greater when two or more of the recalcitrance standards are true, or if the distance below the set point of a standard is increased. For example, an organic contaminant having a solubility of 1 ppb is more recalcitrant than one with a solubility of 100 ppb, (assuming all other factors are equal). Additionally, solubility is the most important standard of recalcitrance, followed by reactivity and then by volatility. Hence a contaminant that is just below the set point for solubility (with a relatively high volatility) would be more recalcitrant than a contaminant just below the set point for volatility with a relatively high solubility.

FIG. 1 is a Table of Relative Recalcitrancy for Selected Organic Contaminants showing the standards of recalcitrance and how those standards apply to various organics. Benzene, dichloroethene (1,2 DCE), ethylbenzene and heptane are considered non-recalcitrant organic contaminants. 1,3,5-trimethylbenzene is an example of a contaminant that approaches being recalcitrant since its volatility of 2.03 mm Hg is very close to, yet above, the volatility set point of <1 mm Hg. Just to the other side of the recalcitrance setpoints is biphenyl, which is marginally recalcitrant with a volatility of 0.01 mm Hg and a solubility of 5,200 µg/L. TNT, biphenyl, malathion, pentachlorophenol, acenapthene, bis (2-ethylhexyl) phthalate, chrysene, napthalene and anthracene are all examples of recalcitrant organic contaminants. Aldrin, Chlordane, DDT and PCBs, particularly PCB 1260, are considered strongly recalcitrant because they are insoluble, nonvolatile and non-reactive.

In general, it has been discovered that the ozonation of recalcitrant organic contaminants in a soil matrix follows a pattern of incubation followed by a rapid and substantial oxidation of the recalcitrant organic contaminants. This pattern is true regardless of the specific recalcitrant organic contaminants in the soil. The incubation step of the invention is complete when the concentration of the recalcitrant organic contaminant has been reduced by from about 10% to about 15% by weight. During the incubation step of the invention, the ozone accomplishes two things. First, the ozone demand of any competitive, non-contaminant ozone consumers in the soil matrix is satisfied. Second, the ozone conditions the contaminated soil matrix to prepare the recalcitrant organic contamination for subsequent rapid and substantial destruction.

When ozone is injected into a soil matrix containing organic contaminants, it can be consumed by not only the organic contaminants but also other, non-contaminant, ozone consuming materials that may originally exist in the soil. If the competing ozone consumers are more reactive than the organic contaminant, the degradation of the organic contaminant may be nominal or non-existent. As ozone injection proceeds, additional ozone consuming materials may form in the soil. All of these other ozone consuming materials compete with the organic contaminants for reaction with the available ozone. These other non-contaminant ozone consumers in soil are often reduced metals, catalytic ozone-destroying minerals and naturally occurring organics.

The reduced metals found in soil are often iron, manganese and arsenic. These can occur naturally in the soil, but are sometimes deposited by man. Before ozonation, the reduced metals can be pretreated with air, oxygen, hydrogen peroxide, chlorine, chlorine dioxide, permanganates or nitrates. This pretreatment oxidizes the reduced metals thereby making them less reactive with the subsequently applied ozone.

Catalytic ozone-destroying minerals are minerals that cause decomposition of the ozone without the minerals being oxidized or reduced. For example, manganese salts are catalytic ozone-destroying minerals. Such minerals are preferably pretreated before ozonation by adding something that will complex or bind the mineral, thereby making them less reactive with the subsequently applied ozone. Basically, the catalytic ozone-destroying minerals are poisoned making them less reactive with the subsequently applied ozone. Where the catalytic ozone-destroying mineral consists of manganese salts, these can be pretreated using phosphates.

The naturally occurring organics in soil can be further divided into materials that are deposited by nature and materials that are deposited by man. The naturally occurring organics deposited by nature are typically humates such as plant and animal materials, lignins, which are by-products of wood, and mixtures of humates and lignins. The naturally occurring organics deposited by man often consist of construction debris, wood chips, animal hides from tanneries and the like.

It was originally believed that once the ozone demand of competitive ozone consumers in the soil matrix was satisfied, the ozone would readily react with the recalcitrant organic contaminants in the soil. However, even in the absence of competitive ozone consumers, it has been discovered that a soil matrix containing recalcitrant organic contamination must first be conditioned before the ozone can rapidly and substantially reduce the concentration of the recalcitrant organic contamination. For example, FIG. 2 shows a laboratory incubation phase of about 3 hours of ozonation for PCP-PAH-TPH in sand and almost 8 hours of ozonation for HCB in sand, i.e., in the absence of competitive ozone consumers. After the incubation phase, the rate of degradation of the contaminants increases rapidly during the oxidation phase. As seen in FIG. 2, HCB is more difficult to oxidize than TPH, PAH and PCP. The TPH-PAH-PCP group is relatively more soluble as well as moderately chemically reactive. HCB has low solubility and is oxidatively stable. Despite the differences between these contaminants, they exhibit the same general behavior: incubation followed by oxidation, with the incubation phase having been completed when the concentration of the recalcitrant contaminant has been reduced by from about 10% to 15%.

The transition from the incubation phase to the oxidation phase is illustrated broadly in FIG. 3 which is a graph showing the contaminant degradation versus time for recalcitrant contaminants. The threshhold between the two phases occurs when the contaminant degradation has reached from about 10% to about 15%. Hence, by monitoring the degradation of the recalcitrant organic contamination, when approximately 10 to 15% of the contaminant has been destroyed, the oxidation phase has begun. This is seen by the dramatic change in the slope of the degradation curve. For some compounds it is expected that the incubation phase will end and the oxidation phase may actually begin before the concentration of the recalcitrant organic contaminant has reached about 10 to 15%. However, when that approximate concentration (10–15%) has been attained, the incubation phase is indeed over and the oxidation phase has begun.

In the presence of competitive ozone consumers, the length of the incubation time and the slope of the oxidation curve are a function of the amount of competitive consumers and the degree of recalcitrance of the contaminant. FIG. 4 is a series of graphs showing the general variability of incubation time and oxidation response as a function of these two factors. When the amount of competitive ozone consumers is low and the contaminant is relatively reactive (e.g., moderately soluble and moderately responsive to oxidation), the incubation time is short and the slope of the oxidation curve is steep (A). If the amount of competitive consumers is increased and the contaminant remains relatively reactive, the incubation time is extended and there is no change in the slope of the oxidation curve (B). If the contaminant is non-reactive (high recalcitrance—low solubility and oxidative stability) the slope of the oxidation curve decreases relative to the reactive contaminants and the length of the incubation period increases (C). With an increase in the amount of competitive ozone consumers and a poorly reactive contaminant, the incubation period is extended (D).

The degree of recalcitrance affects the length of the incubation time period. FIG. 5 shows the minimum incubation times for selected recalcitrant contaminants in the absence of competitive ozone consumers under more or less ideal conditions, i.e., in a laboratory. As seen in FIG. 5, the incubation time increases with increasing recalcitrance. While phthalates have a minimum incubation time of about 12 to about 24 hours, PCBs have minimum incubation times of at least about 100 hours.

Under field conditions, the incubation time periods increase as compared to the lab results. This can be seen by comparing FIGS. 6 and 7. Each of these Figures shows the degradation of carcinogenic PAHs as a function of time. In the laboratory (FIG. 6), the incubation time was about 4.5 hours, while in the field (FIG. 7), the incubation time was about 17 days.

FIG. 8 shows an incubation time of a little more than 5 hours for benzo(a)pyrene under lab conditions. FIG. 9 shows an incubation time of a little less than 30 hours for bis(2-ethylhexyl)phthalate under lab conditions. FIG. 10 shows an incubation time of about 45 minutes for PCP under lab conditions.

FIGS. 11 and 12 demonstrate that non-recalcitrant organic contaminants do not have an incubation phase followed by an oxidation phase. In FIG. 11, the contaminant was a boiler alcohol having a solubility greater than 1000 $\mu$g/L, a volatility greater than 1 mm Hg and was very reactive. In FIG. 12, the contaminant was a non-recalcitrant fuel oil containing 5500 ppm TPH. In both cases, there was no transition from an incubation phase to a oxidation phase. The reaction of the non-recalcitrant contaminant with ozone remained generally high throughout the test.

EXAMPLES

Examples 1 and 2 were carried out in the following manner. In a 5-L round bottom, 3-neck glass reaction flask, the contaminated material was suspended with 3.6 to 4.0 L of water (deionized or groundwater). The suspension was allowed to reach equilibrium by mechanically stirring for 30 minutes. After stirring, a sample (T=0) of the slurry was removed by vacuum aspiration for analysis. Before analysis, the solid and aqueous phases of the slurry were separated by centrifugation (10,000 'g' for 15 minutes at room temperature). The flow of ozone to the reaction flask was begun immediately following sampling. An identical control reaction flask was set up with nitrogen gas instead of ozone. The flow of ozone at the inlet of the reaction flask was maintained at 300–350 mL/min. The ozone gas was produced by passing an industrial grade oxygen gas through a Pacific Technology Model G21 ozone generator operating at 5–7 L/min, 5–6 psi. Average ozone output concentration from the generator was 6–7% by weight. During the test period, slurry samples of approximately 500–1000 mL were collected by vacuum aspiration at appropriate time points. Before analysis, the solid and aqueous phases were separated by centrifugation (10,000 'g' for 15 minutes at room temperature). A final sample was collected and processed in a similar manner at the end of the test period. The influent and effluent gas streams of the ozone reaction flask were sampled for ozone concentration using standard iodometric methods once every 24 hours.

Example 1

Oxidation of PAHs (Creosote) and PCP (Pentachlorophenol)

PAHs and PCP are relatively reactive with ozone. They generally have short incubation times. With PAHs, the size of the molecule (number of rings) affects the incubation time required. Composited soil (840 gm) from a wood treating site contaminated with PAHs and PCP was slurried in the reaction flask. The starting concentration of PAHs was 3350 mg/Kg while the starting concentration of PCP was 28 mg/Kg. The incubation phase observed for the ozone reaction was about 2–6 hours for the PCP and for PAHs with less than 5 rings. The incubation phase for PAHs with more than 4 rings was about 6–8 hours. The concentration of all PAHs was reduced by 98.1% in 23 hours. The concentration of PCP was reduced by 97.5% in 31 hours.

Example 2

Oxidation of Phthalates

Phthalates have moderate activity to ozone and as a result have moderate minimum incubation times of from about 12 to 24 hours. 801 grams of composited soil contaminated with phthalates was suspended in the reaction flask. The starting concentration was 597 mg/Kg bis(2-ethylhexyl) phthalate and 37 mg/Kg Di-n-octyl phthalate. The incubation phase was about 24–48 hours for both phthalate contaminants. The concentration of bis(2-ethylhexyl)phthalate was reduced by 98.2% in 72 hours of ozonation. The concentration of Di-n-octyl phthalate was reduced by 97% in 48 hours of ozonation.

Example 3

In an in situ pilot study of soil containing polycyclic aromatic hydrocarbons, ozonation resulted in an 86% reduction of the polycyclic aromatic hydrocarbons after three months of treatment.

Example 4

In a laboratory study of soil containing polycyclic aromatic hydrocarbons and other petroleum hydrocarbons, ozonation resulted in a 90% reduction of the polycyclic aromatic hydrocarbons and the total petroleum hydrocarbons after 40 hours of ozonation.

Example 5

In an ex situ pilot study of soil containing polycyclic aromatic hydrocarbons and other petroleum hydrocarbons, ozonation resulted in a 68–94% reduction of the polycyclic aromatic hydrocarbons and the total petroleum hydrocarbons after 3 months of ozonation treatment.

Example 6

In a laboratory study, ozonation of API separator sludge resulted in a total petroleum hydrocarbon and polycyclic aromatic hydrocarbon reduction ranging from 67–82% after 80 hours of ozonation treatment.

Example 7

PCB Tests

Several experiments were run using different levels of PCB contamination. Each of these experiments used the same procedure described above for Examples 1 and 2.

Test 1—300 ppm PCB Soil

Soil contaminated with 312 ppm AROCHLOR 1260, a PCB contaminant was reacted with ozone. As shown in FIG. 13, after an incubation phase of about 80 days, the AROCHLOR was reduced by about 98.4% in 42 days. All PCB congeners were equally reduced to a concentration of about 4 ppm.

Test 2—12,000 ppm PCB Soil

Two experiments were run. In the first experiment (FIG. 14A), soil contaminated with 12,100 ppm AROCHLOR 1260, a PCB contaminate, was reacted with ozone. After an incubation phase of about 9 days, the concentration of the AROCHLOR 1260 was reduced by about 90.5 % in 28 days. In the second experiment (FIG. 14B), soil contaminated with 12,300 ppm AROCHLOR 1260 was reacted with ozone. After an incubation phase of about 7 days, the concentration of the AROCHLOR 1260 was reduced by about 91.5% after 56 days. All PCB congeners were equally reduced.

Test 3—24% PCB Soil

Clean sand (without competitive ozone consumers) was mixed with separate phase PCB 1260 to yield a net soil concentration of 244,000 ppm (24%) AROCHLOR 1260. After 40 days, 62.2% of the PCB contaminant was destroyed.

PCBs are a mixture of congeners consisting of different degrees of chlorination. In the preceding PCB experiments, the samples were analyzed for 13 different congeners. For the soil that originally contained approximately 12,000 ppm AROCHLOR, the mean percent degradation after 8 weeks of ozonation for all 13 congeners was 92.8% with a standard deviation of only 3.2%. For the 300 ppm soil, after 6 weeks of ozonation, the mean percent degradation for all 13 congeners was 92.5% with a standard deviation of only 1.6%. Such uniform degradation of the PCB congeners with ozone is very much unlike the biological degradation of PCBs which shows a destruction preference for the less chlorinated congeners.

The experimentation of ozone with PCBs demonstrates that ozonation is an exceptional method of rapidly and substantially reducing the concentration of highly recalcitrant PCBs in soil. Comparing the three levels of PCB experimentation in FIG. 15, it is seen that one can theoretically reduce the concentration of PCBs by more than six orders of magnitude, i.e., beginning with 24% PCB contamination, ozone can be used to achieve a PCB level of about 4 ppm. FIG. 16 is a graph of the expected response of PCB to ozonation using the actual data of the three PCB tests, with extrapolations across the gaps in the concentration levels. For example, starting with a PCB concentration of about 100,000 ppm, it would take about 7 weeks of ozonation to reach a level of about 10,000 ppm PCB. Since this was lab data, field results would be significantly longer.

Example 9

Pesticide Tests

Pesticide Test 1

This test was performed using 20% soil/groundwater slurries (800 grams of composited site soils and 4,000 mL of groundwater) mixed and ozonated in 5 liter round-bottom flasks. Each flask was continuously mixed by mechanical stirring. Representative soil samples were obtained by vacuum aspiration at appropriate sampling times. The slurry samples were separated into aqueous and soil fractions by centrifugation. Soil and aqueous samples were analyzed independently. At the completion of the experiment, the entire quantity of slurry remaining was harvested and fractionated into soil and water fractions for analysis. In addition, the glassware and glass wool plug were solvent washed. This solvent was also analyzed for pesticides.

The reactor received a 5–6% ozone in oxygen gas feed on a continuous basis for 56 days. The control reactor received an oxygen gas feed on a continuous basis for 56 days. Both reactors were sampled and analyzed in singlet for Organophosporous Pesticides and in duplicate for Organochlorine Pesticides Continuous ozonation reduced the soil concentration of Organochlorine pesticides: Endosulfan I was reduced by 97%; Endosulfan II level by 100%; and Methoxychlor level by 100%. FIG. 17 shows an incubation phase for Endosulfan II of about 16 days.

Endosulfan sulfate concentrations increased over time, reaching a peak of 160 mg/kg in the "Day 28" sample. Endosulfan sulfate concentrations decreased 54% over the final 28 days of the study. By contrast, in the Continuous Control reactor, the soil fraction concentrations of Endosulfan I, Endosulfan II, and Methoxychlor did not decrease.

Continuous ozonation significantly reduced the concentrations of Endosulfan I, Endosulfan II, and Methoxychlor present in soil slurries. Endosulfan sulfate, a presumptive degradation product, increased in concentration up to Day 28; its level then decreased over 54% the final 28 days of treatment.

Organophosphorous pesticides were also substantially reduced: Ethyl Parathion was reduced by 100%; Phensulfothion by 100%; Disulfoton by 34.5%; and Phorate by 74.2%.

Pesticide Test 2

Gaseous ozone was injected into an 8" long 2" ID soil column packed with contaminated soil. 75 hours of 300 mL/min of 5% ozone were added. The ozone was effective in oxidizing the pesticides to a great extent. The results are summarized in the following table.

Ozone Results for Pesticides - Test 2

| Soil Column Compound | T = 0 (μg/kg) | T = 75 hours (μg/kg) | percent removed |
|---|---|---|---|
| 4,4'-DDE | 12,000 | 3,650 | 69.6% |
| 4,4'-DDD | 52,500 | 15,500 | 70.5% |
| 4,4'-DDT | 125,000 | 41,000 | 67.2% |
| Toxaphene | 165,000 | 67,000 | 59.4% |
| Chlordane | 9,150 | 5,945 | 35.0% |
| Heptachlor | 22,000 | 1,650 | 92.5% |

The phrase "solid matrix" as used herein is intended to include solid, permeable materials such as soils, either saturated or unsaturated with water, and sludges. The present invention can be successfully applied either in situ or ex situ. A number of treatment configurations may be used in practicing this invention.

A schematic of an ex situ field-scale soil treatment system is shown in FIG. 18. A standard roll-off bin is used as the soil reactor. The soil reactor is filled with soil containing organic contaminants and is retrofitted with solid and perforated piping to allow injection and of ozone and any liquids. The optional liquid recirculation system is provided to maintain a chemical environment in the soil which can be used to optimize the ratio of direct oxidation to radical intermediate formation. The roll-off bin used as the soil reactor is typically 10 to 20 cubic yards in size and includes an impermeable tarp to cover the soil. The soil is usually screened prior to placement in the soil reactor to produce a uniform matrix and promote uniform contact of injected ozone with the entire soil volume. Ozone is generated in the ozone generator and is injected into the soil reactor via perforated piping inserted into the soil matrix. Fluid recirculation is achieved by infiltration into the top of the soil and collection at the bottom of the soil. The effectiveness of treatment can be increased by increasing pH or by supplementing the contaminated matrix with lime, humic acid, or hydrogen peroxide in the liquid circulation system.

Other basic systems include a vadose zone system as shown in FIG. 19. While only a single injection well and a single extraction well are shown in this drawing, it must be understood that multiple injection wells and multiple extraction wells can readily be used at any given site. Another treatment system is a saturated zone treatment system with sparge points and extraction wells as shown in FIG. 20.

The in situ ozonation systems are a direct result of the advances made in air sparging technology. Air sparging uses the controlled injection of air to strip organic compounds from soil and groundwater, or to supply oxygen for oxidation or bioremediation. In conventional air sparging operations, air is injected into the saturated soil within an aquifer. This creates a transient, air-filled porosity, which allows contaminants to volatilize. Vapors are typically extracted from the subsurface by way of a vacuum pump. For in situ ozonation, a properly designed air sparging system is an effective way to deliver ozone to the subsurface. Instead of (or after) sparging air into the well, an ozone generator is used to generate ozone. Ozone for on-site remediation is produced using electrical ozone generators. Corona-discharge units are the most common, although ultraviolet-light-based units are also available. Typical ozone concentrations range from 1 to 6 percent by weight, although higher concentrations can be used.

Because ozone is effectively distributed in both soil and groundwater and rapidly destroys hazardous organics, contaminant cleanup levels can often be reached in a matter of months. This is a significant improvement over the years of treatment often required by air sparging and bioremediation.

With the present invention, it is unnecessary and undesirable to pretreat the ozone with an acid. Such treatment of the ozone with an acid stabilizes the ozone making it less reactive.

While the forms of the invention herein disclosed constitute present embodiments of the invention, many others are possible. It is not intended to mention all of the possible equivalent forms or ramifications of the invention. It is to be understood that the terms used herein are merely descriptive rather than limiting, and that various changes may be made to the invention without departing from the spirit or the scope of the invention.

We claim:

1. A method of reducing the concentration of recalcitrant organic contamination in a soil matrix having competitive non-contaminant ozone consumers therein comprising:
   a) incubating the soil matrix with unacidified ozone to substantially satisfy ozone demand of the competitive non-contaminant ozone consumers and to condition the matrix to prepare the recalcitrant organic contamination in the soil for subsequent destruction so as to provide a preconditioned matrix wherein the concentration of the recalcitrant organic contamination in the preconditioned soil matrix is reduced by about 15% to about 20%; and
   b) thereafter treating the preconditioned matrix by applying additional unacidified ozone sufficient to reduce the concentration of the recalcitrant organic contamination in the soil matrix by at least about 90 percent.

2. The method of claim 1 comprising the additional step c) of pretreating the contaminated soil before step a) to lower the ozone demand of the competitive non-contaminant ozone consumers in the soil.

3. The method of claim 2 wherein the competitive non-contaminant ozone consumers are reduced metals.

4. The method of claim 2 in which the step c) of pretreating is accomplished by injecting an oxidizing material other than ozone into the contaminated soil.

5. The method of claim 4 wherein the oxidizing material is selected from the group consisting of air, oxygen and hydrogen peroxide.

6. The method of claim 1 wherein the competitive non-contaminant ozone consumers are catalytic ozone destroying minerals.

7. The method of claim 6 wherein the catalytic ozone destroying minerals are manganese salts.

8. The method of claim 7 wherein the manganese salts are pretreated with a phosphate.

9. The method of claim 1 wherein the competitive non-contaminant ozone consumers are naturally occurring organic minerals.

10. The method of claim 9 wherein the naturally occurring organic materials are selected from a group consisting of humates, lignins and mixtures thereof.

11. The method of claim 1 wherein the recalcitrant organic contaminant is PCBs.

12. The method of claim 1 wherein the recalcitrant organic contaminant is phthalates.

13. The method of claim 1 wherein the recalcitrant organic contaminant is organopesticides.

14. The method of claim 13 wherein the organopesticides are chlorinated organopesticides.

15. The method of claim 14 wherein the chlorinated organopesticide is DDT.

16. The method of claim 1 wherein the recalcitrant organic contaminant is PAHs.

17. The method of claim 1 wherein the recalcitrant organic contaminant is PCP.

18. A method of reducing the concentration of PCBs in a soil matrix having competitive non-contaminant ozone consumers therein comprising:
   a) incubating the soil matrix with unacidified ozone to substantially satisfy ozone demand of the competitive non-contaminant ozone consumers and to condition the matrix to prepare PCBs in the soil for subsequent destruction so as to provide a preconditioned matrix wherein the concentration of the PCBs in the preconditioned soil matrix is reduced by about 15% to about 20%; and
   b) thereafter treating the preconditioned matrix by applying additional unacidified ozone sufficient to reduce the concentration of the PCBs in the soil matrix by more than 90%.

19. The method of claim 18 wherein in step b) sufficient additional unacidified ozone is applied to the soil matrix to reduce the concentration of PCBs in the soil by more than 98%.

20. The method of claim 18 wherein the step of incubating the soil matrix takes at least 100 hours.

21. The method of claim 18 wherein the step of incubating the soil matrix takes place in situ.

* * * * *